United States Patent
Azuma et al.

(10) Patent No.: US 11,003,159 B2
(45) Date of Patent: May 11, 2021

(54) NUMERICAL CONTROL DEVICE

(71) Applicant: Mitsubishi Electric Corporation, Chiyoda-ku (JP)

(72) Inventors: Toshihiro Azuma, Tokyo (JP); Tomoya Fujita, Tokyo (JP); Masayuki Uematsu, Tokyo (JP); Goh Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 10 days.

(21) Appl. No.: 16/465,864

(22) PCT Filed: Dec. 8, 2016

(86) PCT No.: PCT/JP2016/086599
§ 371 (c)(1),
(2) Date: May 31, 2019

(87) PCT Pub. No.: WO2018/105085
PCT Pub. Date: Jun. 14, 2018

(65) Prior Publication Data
US 2019/0302729 A1    Oct. 3, 2019

(51) Int. Cl.
G05B 19/404    (2006.01)
G05B 19/402    (2006.01)
(Continued)

(52) U.S. Cl.
CPC ......... G05B 19/404 (2013.01); B23Q 15/12 (2013.01); G05B 19/402 (2013.01); G05B 19/416 (2013.01)

(58) Field of Classification Search
CPC .. G05B 19/404; G05B 19/402; G05B 19/416; G05B 2219/42044; G05B 2219/37436;
(Continued)

(56) References Cited

U.S. PATENT DOCUMENTS 4,928,019 A * 5/1990 Tomikawa ............. B23Q 15/18
                                                        250/559.3
5,432,422 A * 7/1995 Nagano ................ G05B 19/404
                                                        318/611
(Continued)

FOREIGN PATENT DOCUMENTS

JP    6-113579 A    4/1994
JP    2001-136767 A    5/2001
(Continued)

OTHER PUBLICATIONS

International Search report dated Jan. 31, 2017 in PCT/JP2016/086599 filed Dec. 8, 2016.

*Primary Examiner* — Ziaul Karim
(74) *Attorney, Agent, or Firm* — Xsensus LLP

(57) ABSTRACT

A numerical control device includes a drive-shaft movement-amount estimation unit to estimate a first movement amount of a first object that is a target to be moved by a first drive shaft by using a first drive signal, an undriven-object movement-amount estimation unit to estimate a second movement amount of a second object in a three dimensional space, which is generated due to a drive force of the first drive shaft, by using the first drive signal, a correction-amount calculation unit to calculate a correction amount for the first drive signal on the basis of the first movement amount and the second movement amount, and a first correction-signal output unit to output a first corrected drive signal obtained by correcting the first drive signal by the correction amount to a drive unit to drive the first drive shaft.

6 Claims, 13 Drawing Sheets

(51) Int. Cl.
*G05B 19/416* (2006.01)
*B23Q 15/12* (2006.01)

(58) Field of Classification Search
CPC ........... G05B 2219/37077; G05B 2219/49176; B23Q 15/12
See application file for complete search history.

(56) References Cited

U.S. PATENT DOCUMENTS

| | | | | |
|---|---|---|---|---|
| 5,523,953 | A * | 6/1996 | Araie | G05B 19/404 |
| | | | | 700/193 |
| 6,738,679 | B2 * | 5/2004 | Fujita | G05B 19/404 |
| | | | | 700/56 |
| 2003/0110006 | A1 * | 6/2003 | Nakamura | G05B 19/406 |
| | | | | 702/176 |
| 2008/0051927 | A1 * | 2/2008 | Prestidge | G05B 19/401 |
| | | | | 700/195 |
| 2009/0292503 | A1 * | 11/2009 | Hon | B23Q 17/22 |
| | | | | 702/168 |

FOREIGN PATENT DOCUMENTS

| | | |
|---|---|---|
| JP | 2002-165474 A | 6/2002 |
| JP | 2006-321033 A | 11/2006 |

* cited by examiner

NUMERICAL CONTROL DEVICE

FIELD

The present invention relates to a numerical control device that controls a machine tool in accordance with a machining program.

BACKGROUND

During machining with a machine tool, operation of a drive shaft may cause mechanical vibrations and thus degrade the machining accuracy or the quality of a machined surface. Particularly, in a case where a movement direction of an object moved by a drive shaft is different from a mechanical vibration direction, even when a feedback control is executed on the drive shaft to suppress deviation in the movement direction of the object moved by the drive shaft, deviation due to mechanical vibrations in a direction different from the movement direction of the object moved by the drive shaft can still not be suppressed. A technique has thus been proposed to suppress vibrations caused by operation of a drive shaft and generated in a direction different from the movement direction of the drive shaft.

For example, Patent Literature 1 discloses a linear motor control method for controlling a position or a velocity of a movable member by detecting a relative position or relative velocity between the movable member and a member to be moved using a position or velocity detector. This control method uses a linear-motor vibration compensatory model including a linear-motor vibration model and a vibration compensator transfer function. The linear-motor vibration model includes a center-of-gravity position transfer function and a rotational amount transfer function. A thrust of the movable member is input to the linear-motor vibration model, while the center-of-gravity position of the movable member and a displacement due to rotation of the movable member detected by the detector are output from the linear-motor vibration model. The linear-motor vibration model outputs a relative position that is the sum of the center-of-gravity position of the movable member and the displacement due to rotation of the movable member. A displacement due to rotation of the movable member detected by the detector is input to the vibration compensator transfer function, while a thrust compensation value is output from the vibration compensator transfer function. A thrust that is a difference between a thrust command and the thrust compensation value is given to the linear-motor vibration model thereby to compensate vibrations that are generated at the relative position.

CITATION LIST

Patent Literature

Patent Literature 1: Japanese Patent Application Laid-open No. 2002-165474

SUMMARY

Technical Problem

Vibrations are generated in a machine tool. Some of the vibrations are generated in a structure other than a workpiece because a drive force for moving the workpiece becomes a reactive force and propagates to the structure. When the vibrations as described above are generated, the relative position of a tool with respect to the workpiece vibrates. This leads to a problem in that the machining accuracy or quality of a machined surface is degraded.

The above technique disclosed in Patent Literature 1 suppresses relative vibrations only caused by movement and rotation of the movable member. Thus, there is a problem of not being able to suppress relative vibrations between a tool and a workpiece that is a movable member in a case where a drive force is transmitted to the tool when the workpiece is moved and thus the tool vibrates.

The present invention has been achieved to solve the above problems, and an object of the present invention is to provide a numerical control device that can suppress vibrations generated in a structure other than a workpiece.

Solution to Problem

In order to solve the above problems and achieve the object, a numerical control device according to the present invention comprises a first estimation unit to estimate a first movement amount of a first object that is a target to be moved by a first drive shaft by using a first drive signal and a second estimation unit to estimate a second movement amount of a second object in a three dimensional space, which is generated due to a drive force of the first drive shaft, by using the first drive signal. The numerical control device further comprises a correction-amount calculation unit to calculate a correction amount for the first drive signal on a basis of the first movement amount and the second movement amount and a first correction-signal output unit to output a first corrected drive signal obtained by correcting the first drive signal by the correction amount to a drive unit to drive the first drive shaft.

Advantageous Effects of Invention

The numerical control device according to the present invention has an effect where it is possible to suppress vibrations generated in a structure other than a workpiece.

DESCRIPTION OF EMBODIMENTS

A numerical control device according to embodiments of the present invention will be described in detail below with reference to the accompanying drawings. The present invention is not limited to the embodiments.

First Embodiment

Figure 1:
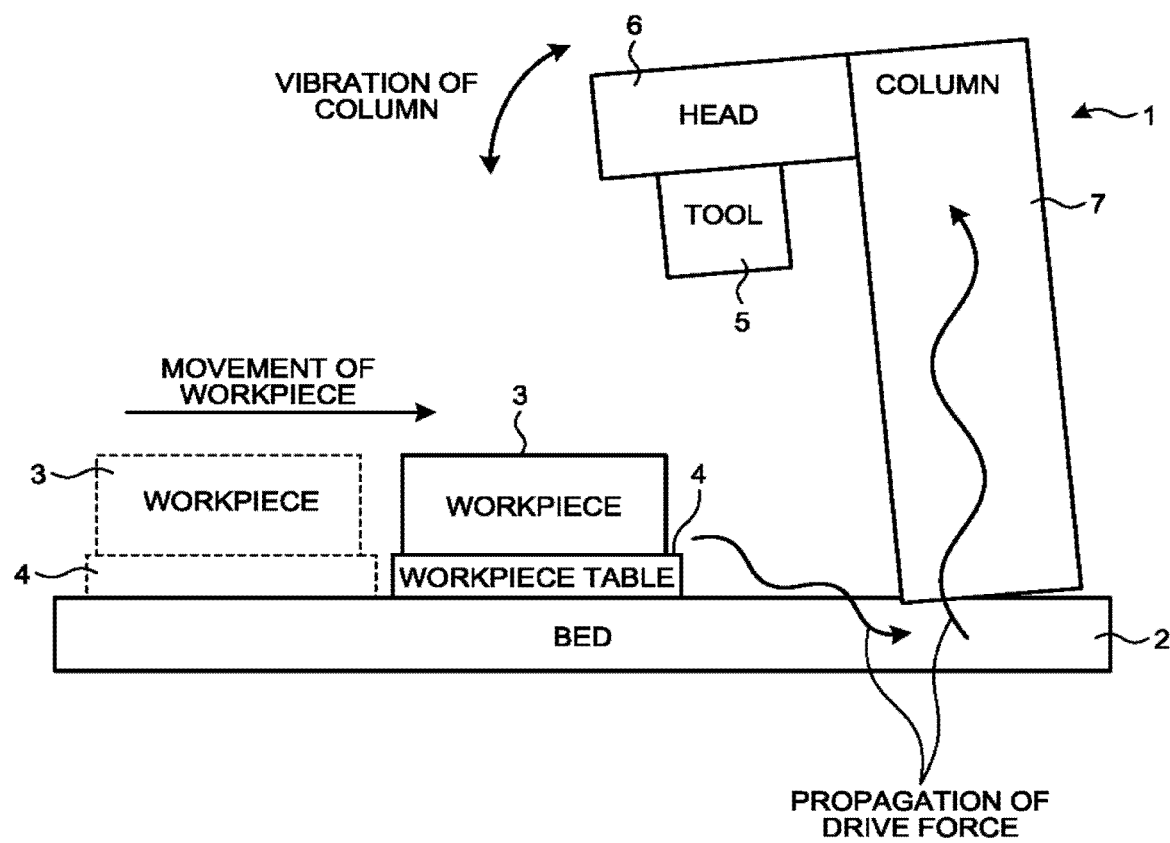
FIG. 1 is a diagram schematically illustrating an example of a configuration of a machine tool.

FIG. 1 is a diagram schematically illustrating an example of a configuration of a machine tool. A machine tool 1 includes a bed 2 that serves as a base, a workpiece table 4 that holds a workpiece 3 to be machined and that is movable in a horizontal direction and rotatable on a horizontal plane, a head 6 that holds a tool 5 and is movable in a vertical direction, and a column 7 that is fixed to the bed 2 and supports the head 6. A numerical control device is connected to the machine tool 1. In accordance with instructions from the numerical control device, the workpiece table 4 moves in the horizontal direction or rotates on the horizontal plane, or the head 6 moves in the vertical direction and thus the workpiece 3 is machined into a desired shape by the tool 5.

In the machine tool 1, a drive force for moving the workpiece table 4 becomes a reactive force and propagates to a structure other than the workpiece 3. This causes vibrations in the structure. Examples of the structure where vibrations are generated include the column 7. When the vibrations described above are generated, the relative position of the tool 5 with respect to the workpiece 3 vibrates. In an embodiment explained below, description is given of the numerical control device that suppresses degradation in machining accuracy or quality of a machined surface when these vibrations are generated.

Figure 2:
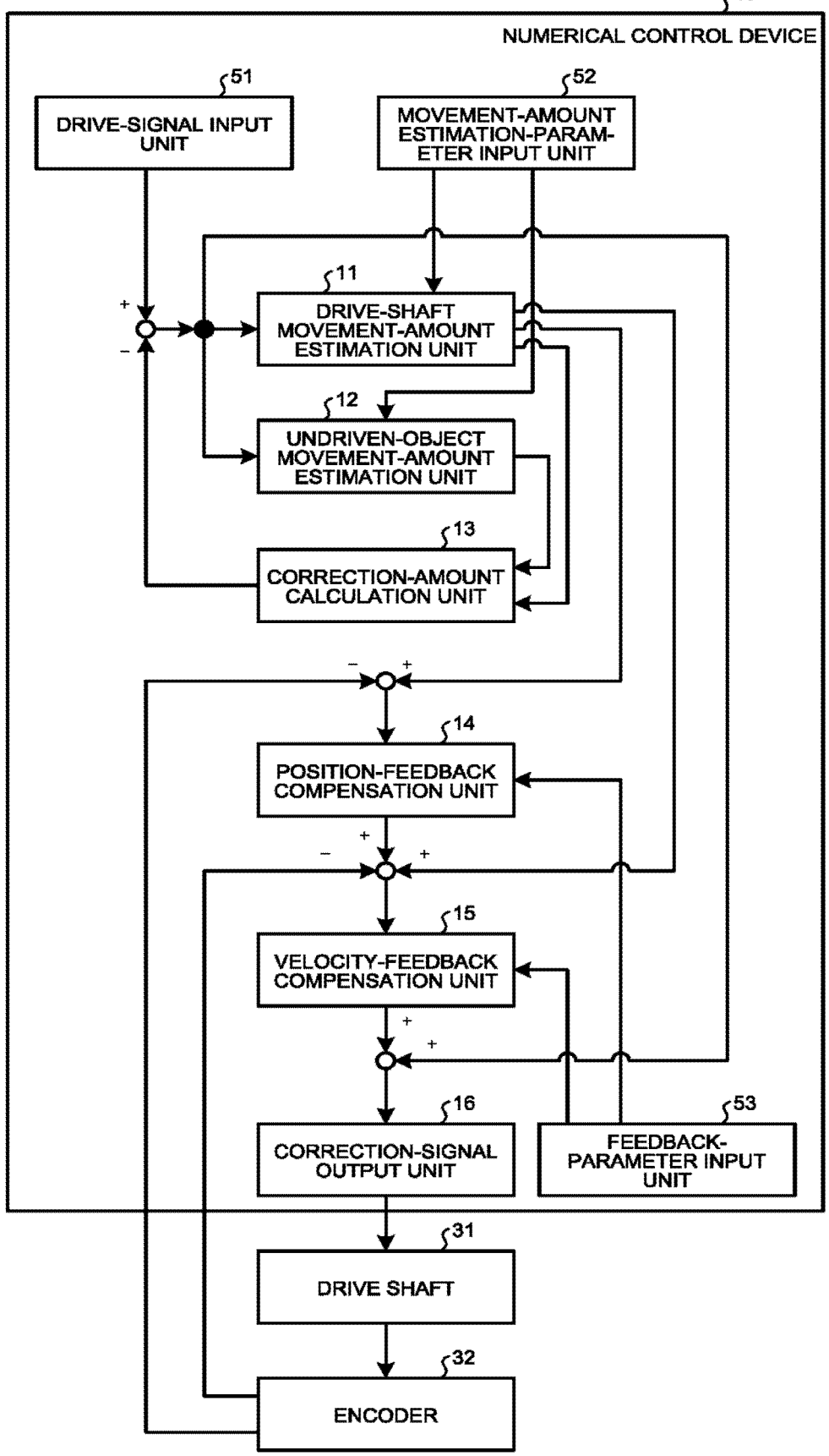
FIG. 2 is a block diagram illustrating an example of a functional configuration of a numerical control device according to a first embodiment of the present invention.

FIG. 2 is a block diagram illustrating an example of a functional configuration of a numerical control device according to a first embodiment of the present invention. A numerical control device 10 is a device that outputs a drive signal to a drive shaft 31 of the machine tool 1 in accordance with a machining program for machining a workpiece. The drive shaft 31 is intended to move the workpiece table 4 or the head 6 in FIG. 1 through a drive unit. The drive shaft 31 includes a translational drive shaft or a rotational drive shaft. The drive unit includes a motor. An encoder 32 is connected to the drive shaft 31, and detects a position and a velocity of a driven target.

The numerical control device 10 includes a drive-shaft movement-amount estimation unit 11 that is a first estimation unit to calculate an estimated movement amount of the drive shaft 31, an undriven-object movement-amount estimation unit 12 that is a second estimation unit to calculate an estimated movement amount of an undriven object in relation to movement of the drive shaft 31, a correction-amount calculation unit 13 that calculates a correction amount for a drive signal, a position-feedback compensation unit 14 that calculates a position feedback compensation value, a velocity-feedback compensation unit 15 that calculates a velocity feedback compensation value, and a correction-signal output unit 16 that calculates a corrected drive signal.

The numerical control device 10 further includes a drive-signal input unit 51 that receives a drive signal, a movement-amount estimation-parameter input unit 52 that receives a parameter to represent a model used to estimate a movement amount of a first object moved by the drive shaft 31, and a parameter to represent a model used to estimate a movement amount of a second undriven object in relation to the movement of the drive shaft 31, and a feedback-parameter input unit 53 that receives inputs of position and velocity feedback parameters. In the numerical control device 10, the undriven object is a constituent member of the machine tool 1 other than the target object to be moved by the drive shaft 31. For example, in a case where the drive shaft 31 is intended for moving the workpiece table 4, the undriven objects are the head 6 and the column 7.

The drive-shaft movement-amount estimation unit 11 estimates a drive-shaft movement amount that is a first movement amount of a first object to be moved by the drive shaft 31 by using a model. The model is determined in advance on the basis of a parameter to represent a model used to estimate a displacement of the drive shaft 31, the parameter being received from the movement-amount estimation-parameter input unit 52, a drive signal received from the drive-signal input unit 51, and a correction amount received from the correction-amount calculation unit 13. Examples of the drive-shaft movement amount of the first object can include at least one of the object position, displacement, velocity, acceleration, attitude, change in attitude of the object, rate of change in attitude thereof, and acceleration of change in attitude thereof. In the following explanation, an example is described in which an estimated drive-shaft position and an estimated drive-shaft velocity are used as the drive-shaft movement amount. The drive-shaft movement-amount estimation unit 11 transmits the calculated estimated drive-shaft position and estimated drive-shaft velocity to the correction-amount calculation unit 13, transmits the calculated estimated drive-shaft position to the position-feedback compensation unit 14, and transmits the calculated estimated drive-shaft velocity to the velocity-feedback compensation unit 15.

The undriven-object movement-amount estimation unit 12 estimates an undriven-object movement amount that is a second movement amount of a second object other than a target to be moved by the drive shaft 31 by using a model, the movement amount being generated in a three dimensional space due to a drive force of the drive shaft 31. The model is determined in advance on the basis of a parameter to represent a model used to estimate an undriven-object movement amount, the parameter being received from the movement-amount estimation-parameter input unit 52, a drive signal received from the drive-signal input unit 51, and a correction amount received from the correction-amount calculation unit 13. The undriven-object movement-amount estimation unit 12 transmits the calculated undriven-object movement amount to the correction-amount calculation unit 13.

It is desirable that the undriven-object movement amount includes any of a relative displacement, a relative velocity, a relative acceleration, a change in relative attitude, a rate of change in relative attitude, and an acceleration of change in relative attitude. The relative displacement is a displacement of the relative position of the tool 5 with respect to the position of the workpiece 3. The relative velocity is a velocity of the relative position of the tool 5 with respect to the position of the workpiece 3. The relative acceleration is an acceleration of the relative position of the tool 5 with respect to the position of the workpiece 3. The change in relative attitude is an attitude of the tool 5 with respect to the attitude of the workpiece 3. The rate of change in relative attitude is a rate of change in attitude of the tool 5 with respect to the attitude of the workpiece 3. The acceleration of change in relative attitude is an acceleration of change in attitude of the tool 5 with respect to the attitude of the workpiece 3. Using these types of information makes it possible to suppress relative vibrations between the workpiece 3 and the tool 5.

It is also allowable to estimate an undriven-object movement amount in a three dimensional space in a direction different from the movement direction of the drive shaft 31. Specifically, it is also allowable to estimate a displacement of the second object in a direction different from the movement direction of the first object moved by the drive shaft 31, a velocity thereof in a direction different from the movement direction of the first object moved by the drive shaft 31, an acceleration thereof in a direction different from the movement direction of the first object moved by the drive shaft 31, a change in attitude thereof about the center axis in a direction different from the rotational center axis of the first object moved by the drive shaft 31, a rate of change in attitude thereof about the center axis in a direction different from the rotational center axis of the first object moved by the drive shaft 31, or an acceleration of change in attitude thereof about the center axis in a direction different from the rotational center axis of the first object moved by the drive shaft 31. Estimating these types of information makes it possible to suppress vibrations even in a case where the vibration direction of the machine tool 1 is different from the movement direction of the first object moved by the drive shaft 31.

Further, the undriven-object movement-amount estimation unit 12 is constituted of a state space model in which at least one of the position, velocity, acceleration, and drive force of the drive shaft 31, which are instructed to the drive shaft 31, is used as a part of inputs, and a displacement of the second object, a velocity thereof, an acceleration thereof, a change in attitude thereof, a rate of change in attitude thereof, or an acceleration of change in attitude thereof is used as a part of outputs or as a part of the internal state amount. By using a state space model that can represent a multi-input multi-output system, the numerical control device 10 can simultaneously suppress vibrations in multiple directions such as vibrations in a direction that is the same as the drive shaft 31 and vibrations in a direction different from the drive shaft 31.

A simulation on the basis of the finite element method or dynamic model is used in order to construct the state space model as described above which is capable of representing a relative displacement between the workpiece 3 and the tool 5 in a three dimensional space. It is also possible to perform system identification by measuring in advance the relative displacement generated when the drive shaft 31 is operated. When system identification is performed, an additional sensor is used only for the advanced measurement so as to improve the model accuracy. However, the present embodiment is not limited to these methods.

The correction-amount calculation unit 13 calculates a correction amount for a drive signal in accordance with a model determined in advance on the basis of a drive-shaft movement amount received from the drive-shaft movement-amount estimation unit 11, and an undriven-object movement amount received from the undriven-object movement-amount estimation unit 12. This correction amount calculation processing is intended to take into account an influence of the movement amount of the second object generated due to a drive force of the drive shaft 31 on the first object. The correction-amount calculation unit 13 transmits the calculated correction amount to the drive-shaft movement-amount estimation unit 11, the undriven-object movement-amount estimation unit 12, and the correction-signal output unit 16. In the correction amount calculation, a feedback gain is calculated in advance by optimal regulator design on the basis of the model of the undriven-object movement-amount estimation unit 12 so as to multiply the undriven-object movement amount by the calculated feedback gain. However, the present embodiment is not limited thereto.

The position-feedback compensation unit 14 calculates a position feedback compensation value in accordance with a model determined in advance on the basis of a parameter received from the feedback-parameter input unit 53 and used for position feedback compensation, an estimated drive-shaft position received from the drive-shaft movement-amount estimation unit 11, and a feedback position received from the encoder 32. The position-feedback compensation unit 14 transmits the calculated position feedback compensation value to the velocity-feedback compensation unit 15.

The velocity-feedback compensation unit 15 calculates a velocity feedback compensation value in accordance with a model determined in advance on the basis of a parameter received from the feedback-parameter input unit 53 and used for velocity feedback compensation, an estimated drive-shaft velocity received from the drive-shaft movement-amount estimation unit 11, a position feedback compensation value received from the position-feedback compensation unit 14, and a feedback velocity received from the encoder 32. The velocity-feedback compensation unit 15 transmits the calculated velocity feedback compensation value to the correction-signal output unit 16.

The correction-signal output unit 16 calculates a corrected drive signal on the basis of a drive signal received from the drive-signal input unit 51, a correction amount received from the correction-amount calculation unit 13, and a velocity feedback compensation value received from the velocity-feedback compensation unit 15. The correction-signal output unit 16 transmits the calculated corrected drive signal to the drive unit that drives the drive shaft 31.

The drive-signal input unit 51 receives an input of a drive signal and transmits the drive signal to the drive-shaft movement-amount estimation unit 11, the undriven-object movement-amount estimation unit 12, and the correction-signal output unit 16.

The movement-amount estimation-parameter input unit 52 receives an input of an undriven-object movement amount estimation parameter that represents a model used to estimate an undriven-object movement amount. The movement-amount estimation-parameter input unit 52 transmits the undriven-object movement amount estimation parameter to the undriven-object movement-amount estimation unit 12. Use of the undriven-object movement amount estimation parameter makes it possible to suppress vibrations in accordance with differences between individual machine tools 1. It is also allowable that the movement-amount estimation-parameter input unit 52 receives an input of the drive-shaft movement amount estimation parameter that represents a model used to estimate a drive-shaft movement amount, and transmits the drive-shaft movement amount estimation parameter to the drive-shaft movement-amount estimation unit 11. By using the drive-shaft movement amount estimation parameter as described above, the numerical control device 10 can estimate deviation from a command and thus can obtain more preferable effects as compared to the case where only the undriven-object movement amount estimation parameter is used. In the specification of the present invention, an example is described in which the movement-amount estimation-parameter input unit 52 transmits the undriven-object movement amount estimation parameter to the undriven-object movement-amount estimation unit 12, and transmits the drive-shaft movement amount estimation parameter to the drive-shaft movement-amount estimation unit 11.

The feedback-parameter input unit 53 receives an input of a position compensation parameter to be used for position feedback compensation and an input of a velocity compensation parameter to be used for velocity feedback compensation. The feedback-parameter input unit 53 transmits the position compensation parameter to the position-feedback compensation unit 14, and transmits the velocity compensation parameter to the velocity-feedback compensation unit 15.

The drive shaft 31 receives a corrected drive signal from the correction-signal output unit 16, drives the workpiece 3 or the tool 5, and transmits movement or rotation of the drive shaft 31 to the encoder 32.

The encoder 32 obtains a feedback position and a feedback velocity of the drive shaft 31 on the basis of a displacement generated between a movable portion and a fixed portion (both are not illustrated) inside the encoder 32 as the drive shaft 31 is operated. The encoder 32 transmits the feedback position to the position-feedback compensation unit 14, and transmits the feedback velocity to the velocity-feedback compensation unit 15.

Figure 3:
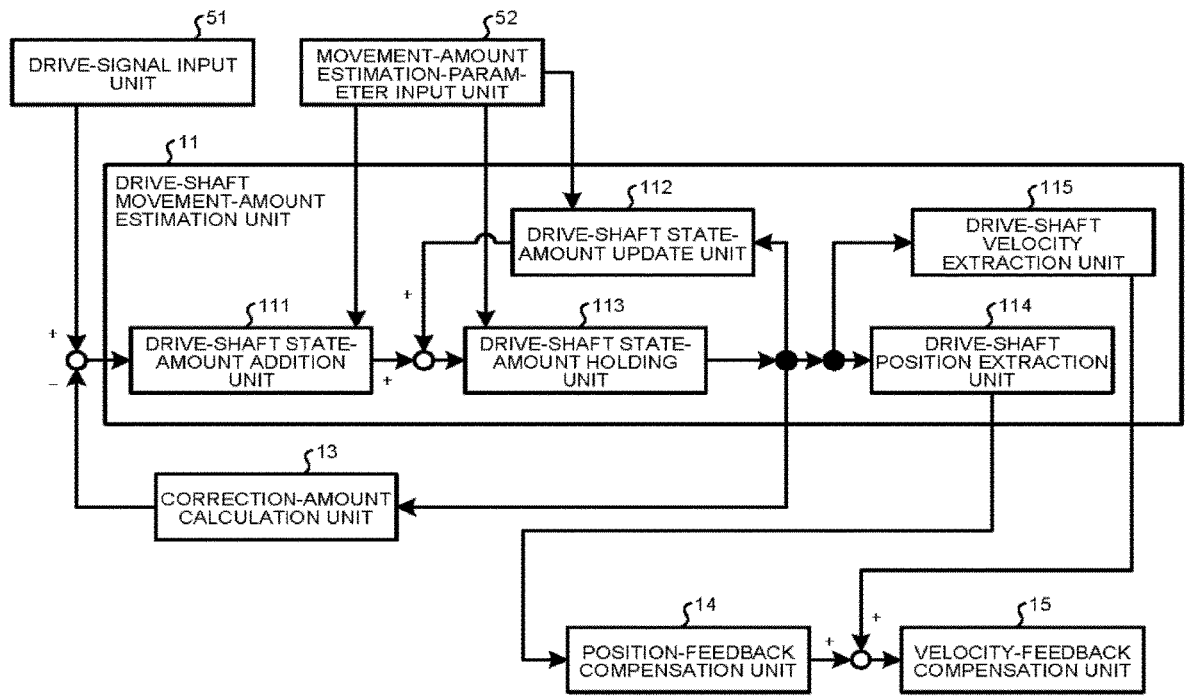
FIG. 3 is a block diagram schematically illustrating an example of a functional configuration of a drive-shaft movement-amount estimation unit according to the first embodiment of the present invention.

Next, respective functional configurations of the drive-shaft movement-amount estimation unit 11 and the undriven-object movement-amount estimation unit 12 are described in further detail. FIG. 3 is a block diagram schematically illustrating an example of a functional configuration of the drive-shaft movement-amount estimation unit according to the first embodiment of the present invention.

The drive-shaft movement-amount estimation unit 11 includes a drive-shaft state-amount addition unit 111 that calculates a change in drive-shaft state amount, a drive-shaft state-amount update unit 112 that calculates a drive-shaft state amount at the next time in a case where there is not an input signal, a drive-shaft state-amount holding unit 113 that holds therein an amount of change in drive-shaft state amount and a drive-shaft state amount at the next time, a drive-shaft position extraction unit 114 that extracts an estimated drive-shaft position, and a drive-shaft velocity extraction unit 115 that extracts an estimated drive-shaft velocity.

The drive-shaft state amount is a physical amount to be used to estimate a drive-shaft movement amount. For example, in order to estimate a position, the drive-shaft state-amount holding unit 113 holds therein a position and a velocity that serve as a drive-shaft state amount. Estimation of the next position is performed by adding the previous position to a value obtained by multiplying a time difference from the previous time by the velocity. It is also possible to further hold an acceleration in the drive-shaft state-amount holding unit 113 in addition to the position and the velocity that serve as a drive-shaft state amount. In this case, a change in velocity from the previous time to the next time is calculated on the basis of the acceleration, and the average of the calculated velocities is used to estimate the next position. It is also possible that a position command and a velocity command to the drive shaft 31 are simply used as they are as the next position and the next velocity. However, the present embodiment is not limited thereto.

The drive-shaft state-amount addition unit 111 calculates the amount of change in drive-shaft state amount given by a difference between a drive signal received from the drive-signal input unit 51 and a correction amount received from the correction-amount calculation unit 13 in accordance with a predetermined model, and transmits the calculated amount of change in drive-shaft state amount to the drive-shaft state-amount holding unit 113.

The drive-shaft state-amount update unit 112 receives the drive-shaft state amount from the drive-shaft state-amount holding unit 113, calculates a drive-shaft state amount at the next time in a case where there is not an input signal, and transmits the calculated drive-shaft state amount to the drive-shaft state-amount holding unit 113.

The drive-shaft state-amount holding unit 113 stores therein a drive-shaft state amount that is the sum of the amount of change in drive-shaft state amount, which is given by a difference between the drive signal and the correction amount and received from the drive-shaft state-amount addition unit 111, and the drive-shaft state amount at the next time in a case where there is not an input signal, the drive-shaft state amount being received from the drive-shaft state-amount update unit 112. The drive-shaft state-amount holding unit 113 transmits the drive-shaft state amount to the correction-amount calculation unit 13, the drive-shaft position extraction unit 114, and the drive-shaft velocity extraction unit 115.

The drive-shaft position extraction unit 114 extracts an estimated drive-shaft position from the drive-shaft state amount, and transmits the extracted estimated drive-shaft position to the position-feedback compensation unit 14.

The drive-shaft velocity extraction unit 115 extracts an estimated drive-shaft velocity from the drive-shaft state amount, and transmits the extracted estimated drive-shaft velocity to the velocity-feedback compensation unit 15.

Due to such a configuration as described above, the drive-shaft movement-amount estimation unit 11 estimates a drive-shaft state amount, an estimated drive-shaft position, and an estimated drive-shaft velocity from a difference between a drive signal received from the drive-signal input unit 51 and a correction amount received from the correction-amount calculation unit 13. The drive-shaft state amount is then output to the correction-amount calculation unit 13. The estimated drive-shaft position is output to the position-feedback compensation unit 14. The estimated drive-shaft velocity is output to the velocity-feedback compensation unit 15.

Figure 4:
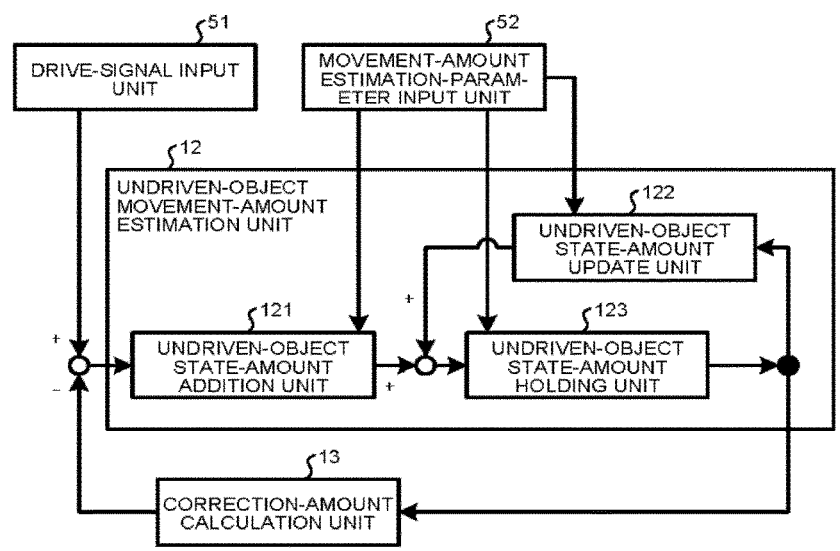
FIG. 4 is a block diagram schematically illustrating an example of a functional configuration of an undriven-object movement-amount estimation unit according to the first embodiment of the present invention.

FIG. 4 is a block diagram schematically illustrating an example of a functional configuration of the undriven-object movement-amount estimation unit according to the first embodiment of the present invention. The undriven-object movement-amount estimation unit 12 includes an undriven-object state-amount addition unit 121 that calculates a change in undriven-object state amount, an undriven-object state-amount update unit 122 that calculates an undriven-object state amount at the next time in a case where there is not an input signal, and an undriven-object state-amount holding unit 123 that holds therein an amount of change in undriven-object state amount and an undriven-object state amount at the next time.

The undriven-object state amount is a physical amount to be used to estimate an undriven-object movement amount. For example, in order to estimate a position, the undriven-object state-amount holding unit 123 holds therein a position and a velocity that serve as an undriven-object state amount. Estimation of the next position is performed by adding the previous position to a value obtained by multiplying a time difference from the previous time by the velocity. It is also possible to further hold an acceleration in the undriven-object state-amount holding unit 123 in addition to the position and the velocity that serve as an undriven-object state amount. In this case, a change in velocity from the previous time to the next time is calculated on the basis of the acceleration, and the average of the calculated velocities is used to estimate the next position. However, the present embodiment is not limited thereto.

The undriven-object state-amount addition unit 121 calculates the amount of change in undriven-object state amount given by a difference between a drive signal received from the drive-signal input unit 51 and a correction amount received from the correction-amount calculation unit 13 in accordance with a predetermined model, and transmits the calculated amount of change in undriven-object state amount to the undriven-object state-amount holding unit 123.

The undriven-object state-amount update unit 122 receives the undriven-object state amount from the undriven-object state-amount holding unit 123, calculates an undriven-object state amount at the next time in a case where there is not an input signal, and transmits the calculated undriven-object state amount to the undriven-object state-amount holding unit 123.

The undriven-object state-amount holding unit 123 stores therein an undriven-object state amount that is the sum of the amount of change in undriven-object state amount, which is given by a difference between the drive signal and the correction amount and received from the undriven-object state-amount addition unit 121, and the undriven-object state amount at the next time in a case where there is not an input signal, the undriven-object state amount being received from the undriven-object state-amount update unit 122. The undriven-object state-amount holding unit 123 transmits the undriven-object state amount to the correction-amount calculation unit 13.

Due to such a configuration as described above, the undriven-object movement-amount estimation unit 12 esti- mates an undriven-object state amount from a difference between a drive signal received from the drive-signal input unit 51 and a correction amount received from the correction-amount calculation unit 13. The undriven-object movement-amount estimation unit 12 then outputs the estimated undriven-object state amount to the correction-amount calculation unit 13.

Figure 5:
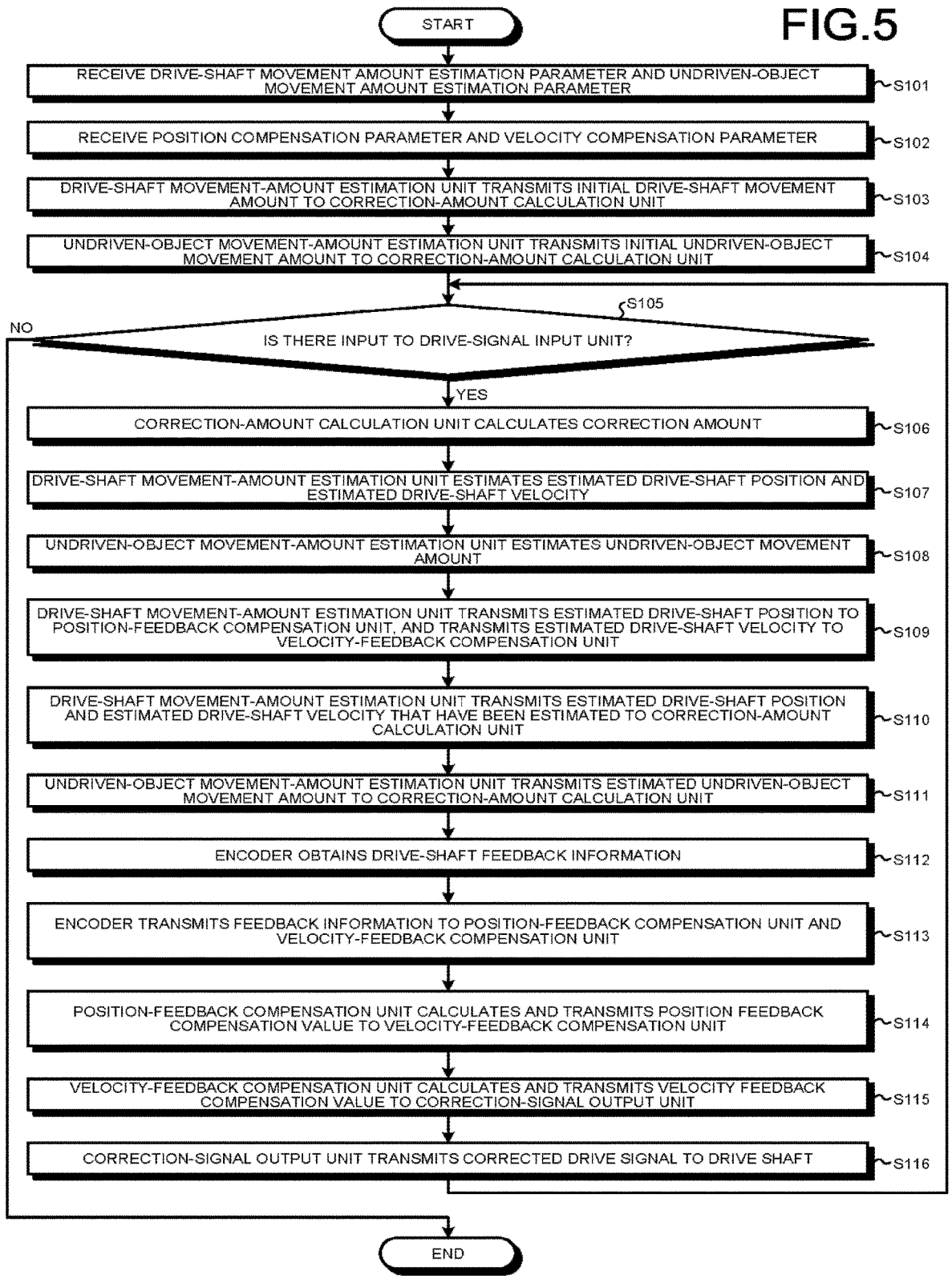
FIG. 5 is a flowchart illustrating an example of a procedure for vibration suppression processing performed by the numerical control device according to the first embodiment of the present invention.

Next, vibration suppression processing in the numerical control device according to the first embodiment is described. FIG. 5 is a flowchart illustrating an example of a procedure for vibration suppression processing performed by the numerical control device according to the first embodiment of the present invention. Description is herein given of a processing flow in the functional configuration of the numerical control device 10 in FIG. 2.

First, the movement-amount estimation-parameter input unit 52 receives an input of the drive-shaft movement amount estimation parameter and an input of the undriven-object movement amount estimation parameter. Subsequently, at Step S101, the drive-shaft movement-amount estimation unit 11 and the undriven-object movement-amount estimation unit 12 receive the drive-shaft movement amount estimation parameter and the undriven-object movement amount estimation parameter, respectively, from the movement-amount estimation-parameter input unit 52. The drive-shaft movement amount estimation parameter is necessary information for the drive-shaft movement-amount estimation unit 11 to calculate an estimated drive-shaft position and an estimated drive-shaft velocity using a state space model. The undriven-object movement amount estimation parameter is necessary information for the undriven-object movement-amount estimation unit 12 to calculate an undriven-object movement amount using a state space model.

The feedback-parameter input unit 53 receives an input of a position compensation parameter and an input of a velocity compensation parameter. Subsequently, at Step S102, the position-feedback compensation unit 14 and the velocity-feedback compensation unit 15 receive the position compensation parameter and the velocity compensation parameter, respectively, from the feedback-parameter input unit 53.

Next, at Step S103, the drive-shaft movement-amount estimation unit 11 transmits an initial drive-shaft movement amount to the correction-amount calculation unit 13. At Step S104, the undriven-object movement-amount estimation unit 12 transmits an initial undriven-object movement amount to the correction-amount calculation unit 13.

Thereafter, at Step S105, whether there is a drive signal input to the drive-signal input unit 51 is checked. When there is not a drive signal input to the drive-signal input unit 51, that is, in a case of NO at Step S105, the entire processing is ended.

In contrast, when there is a drive signal input to the drive-signal input unit 51, that is, in a case of YES at Step S105, the correction-amount calculation unit 13 calculates a correction amount on the basis of the drive-shaft movement amount and the undriven-object movement amount at Step S106.

Subsequently, at Step S107, the drive-shaft movement-amount estimation unit 11 estimates an estimated drive-shaft position and an estimated drive-shaft velocity on the basis of the drive signal received from the drive-signal input unit 51 and the correction amount calculated at Step S106. At Step S108, the undriven-object movement-amount estimation unit 12 estimates an undriven-object movement amount on the basis of the drive signal and the correction amount.

Thereafter, at Step S109, the drive-shaft movement-amount estimation unit 11 transmits the estimated drive-shaft position to the position-feedback compensation unit 14, and transmits the estimated drive-shaft velocity to the velocity-feedback compensation unit 15. At Step S110, the drive-shaft movement-amount estimation unit 11 transmits the estimated drive-shaft position and the estimated drive-shaft velocity that have been estimated to the correction-amount calculation unit 13. Further, at Step S111, the undriven-object movement-amount estimation unit 12 transmits the estimated undriven-object movement amount to the correction-amount calculation unit 13. These estimated drive-shaft position, estimated drive-shaft velocity, and estimated undriven-object movement amount are used when the next drive signal is input.

Next, at Step S112, the encoder 32 obtains feedback information of the drive shaft 31. The feedback information includes a feedback position and a feedback velocity. Thereafter, at Step S113, the encoder 32 transmits the feedback information of the drive shaft 31 to the position-feedback compensation unit 14 and the velocity-feedback compensation unit 15. In this example, the encoder 32 transmits the feedback position to the position-feedback compensation unit 14 and transmits the feedback velocity to the velocity-feedback compensation unit 15.

Subsequently, at Step S114, the position-feedback compensation unit 14 calculates a position feedback compensation value on the basis of the estimated drive-shaft position received at Step S109, the feedback position received at Step S113, and the position compensation parameter received at Step S102. The position-feedback compensation unit 14 then transmits the calculated position feedback compensation value to the velocity-feedback compensation unit 15.

Thereafter, at Step S115, the velocity-feedback compensation unit 15 calculates a velocity feedback compensation value on the basis of the estimated drive-shaft velocity received at Step S109, the feedback velocity received at Step S113, the position feedback compensation value received at Step S114, and the velocity compensation parameter received at Step S102. The velocity-feedback compensation unit 15 then transmits the calculated velocity feedback compensation value to the correction-signal output unit 16.

Subsequently, the correction-signal output unit 16 calculates a corrected drive signal by subtracting the correction amount calculated by the correction-amount calculation unit 13 from the drive signal received from the drive-signal input unit 51, and further adding the velocity feedback compensation value calculated by the velocity-feedback compensation unit 15 to the subtraction result. At Step S116, the correction-signal output unit 16 transmits the corrected drive signal to the drive shaft 31. Thereafter, the process returns to Step S105 to repeat the processes of Steps S106 to S116 during a period for which a drive signal is input.

Figure 6:
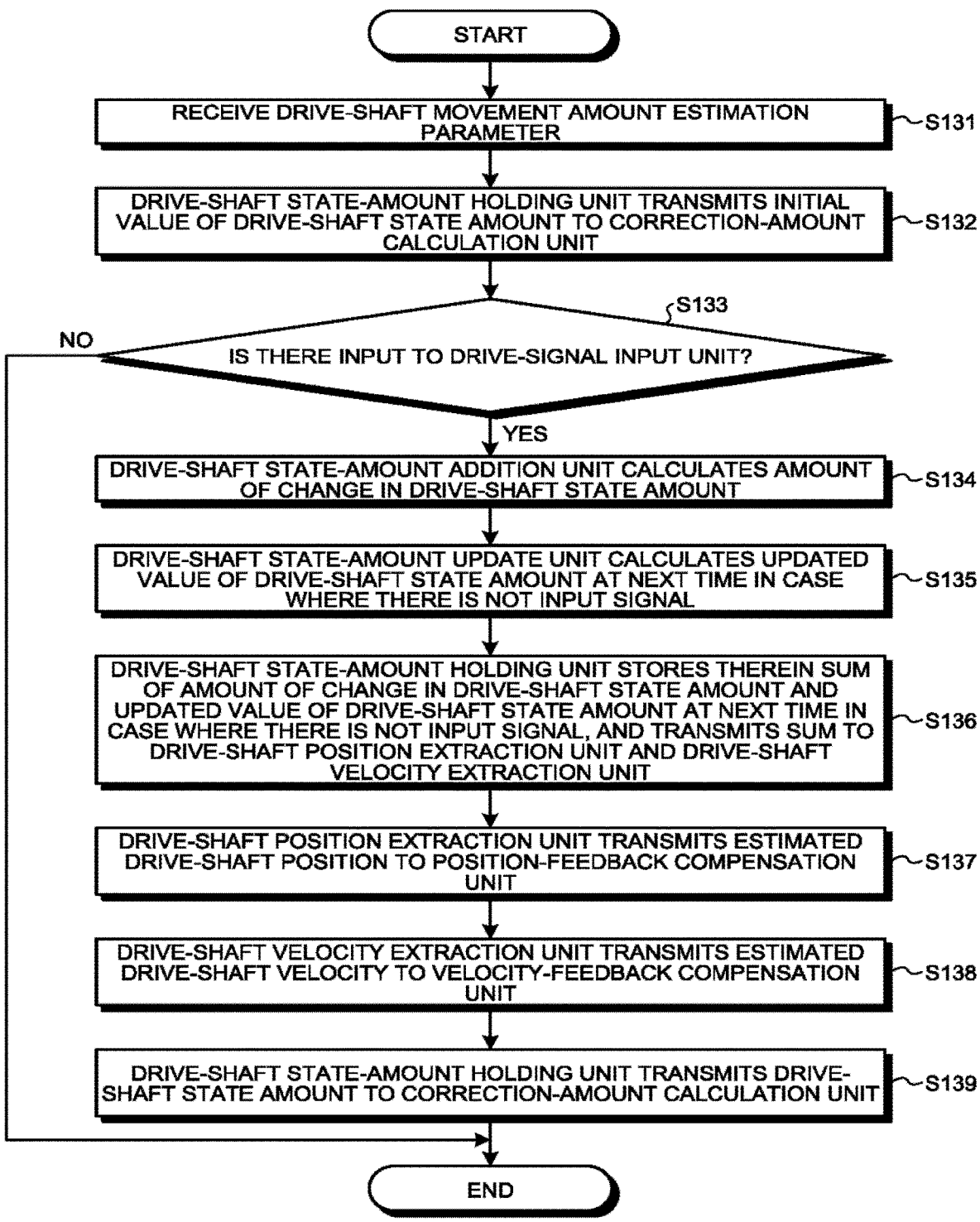
FIG. 6 is a flowchart illustrating an example of a processing procedure for the drive-shaft movement-amount estimation unit according to the first embodiment of the present invention.

The processing in the drive-shaft movement-amount estimation unit 11 is now described in detail. FIG. 6 is a flowchart illustrating an example of a processing procedure for the drive-shaft movement-amount estimation unit according to the first embodiment of the present invention. The processing is described below in accordance with the functional configuration of the drive-shaft movement-amount estimation unit 11 in FIG. 3.

First, at Step S131, the drive-shaft state-amount addition unit 111, the drive-shaft state-amount update unit 112, and the drive-shaft state-amount holding unit 113 receive a drive-shaft movement amount estimation parameter from the movement-amount estimation-parameter input unit 52. Next, at Step S132, the drive-shaft state-amount holding unit 113 transmits an initial value of the drive-shaft state amount to the correction-amount calculation unit 13.

Thereafter, at Step S133, whether there is a drive signal input to the drive-signal input unit 51 is checked. When there is not a drive signal input to the drive-signal input unit 51, that is, in a case of NO at Step S133, the entire processing is ended.

In contrast, when there is a drive signal input to the drive-signal input unit 51, that is, in a case of YES at Step S133, the drive-shaft state-amount addition unit 111 receives the drive signal from the drive-signal input unit 51 and the correction amount from the correction-amount calculation unit 13, and calculates the amount of change in drive-shaft state amount caused due to a signal obtained by subtracting the correction amount from the drive signal at Step S134. At the time of this calculation, the drive-shaft movement amount estimation parameter having been received at Step S131 is used.

Subsequently, at Step S135, the drive-shaft state-amount update unit 112 receives the drive-shaft state amount from the drive-shaft state-amount holding unit 113, and calculates an updated value of the drive-shaft state amount at the next time in a case where there is not an input signal. At the time of this calculation, the drive-shaft movement amount estimation parameter having been received at Step S131 is used.

At Step S136, the drive-shaft state-amount holding unit 113 stores therein the drive-shaft state amount that is the sum of the amount of change in drive-shaft state amount and the updated value of the drive-shaft state amount at the next time in a case where there is not an input signal. The drive-shaft state-amount holding unit 113 transmits the updated value of the drive-shaft state amount to the drive-shaft position extraction unit 114 and the drive-shaft velocity extraction unit 115.

Thereafter, at Step S137, the drive-shaft position extraction unit 114 extracts an estimated drive-shaft position from the drive-shaft state amount, and transmits the extracted estimated drive-shaft position to the position-feedback compensation unit 14. At Step S138, the drive-shaft velocity extraction unit 115 extracts an estimated drive-shaft velocity from the drive-shaft state amount, and transmits the extracted estimated drive-shaft velocity to the velocity-feedback compensation unit 15. Further, at Step S139, the drive-shaft state-amount holding unit 113 transmits the drive-shaft state amount to the correction-amount calculation unit 13. Upon completion of the above steps, the processing in the drive-shaft movement-amount estimation unit 11 is ended.

Figure 7:
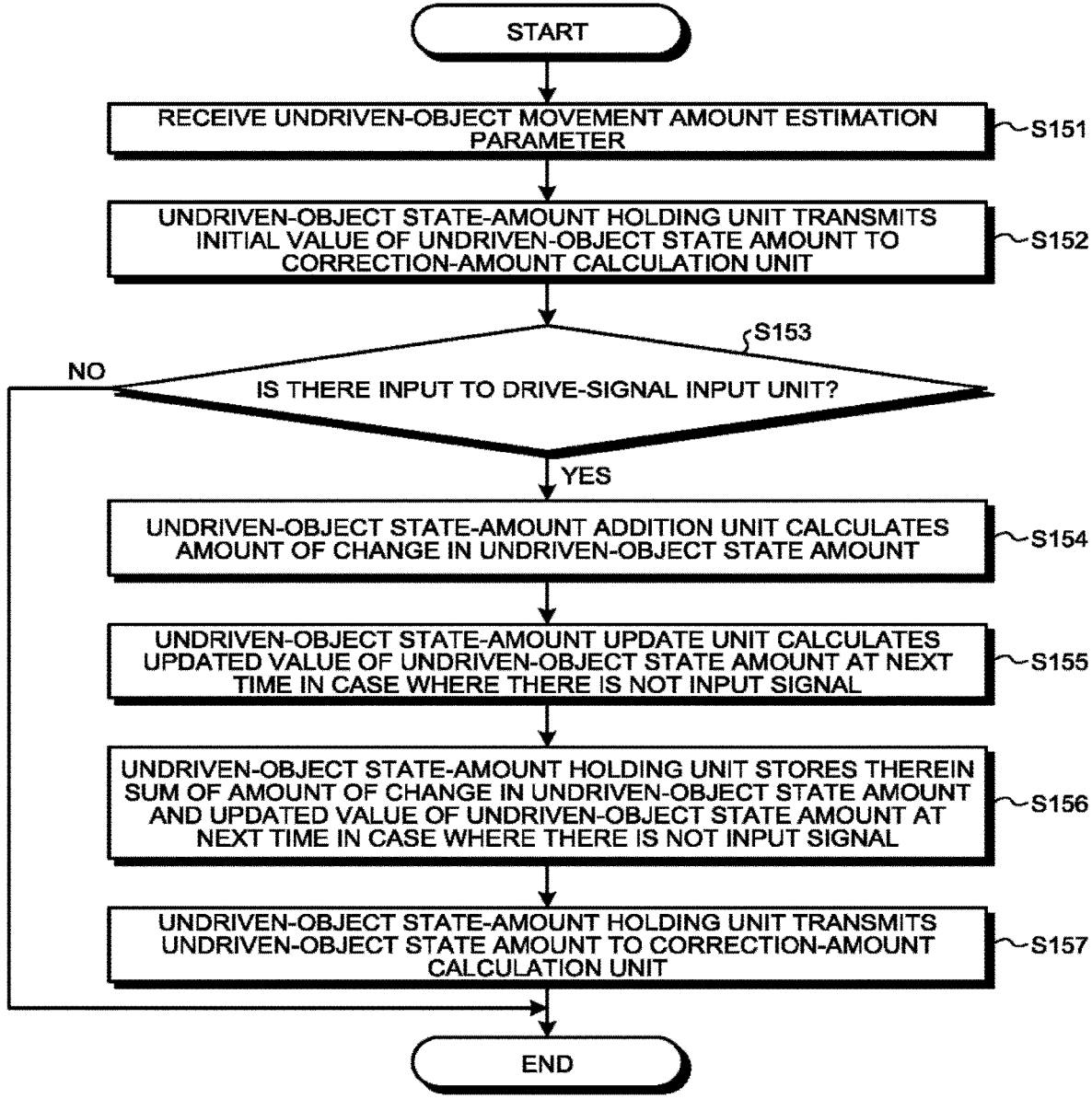
FIG. 7 is a flowchart illustrating an example of a processing procedure for the undriven-object movement-amount estimation unit according to the first embodiment of the present invention.

Next, the processing in the undriven-object movement-amount estimation unit 12 is described in detail. FIG. 7 is a flowchart illustrating an example of a processing procedure for the undriven-object movement-amount estimation unit according to the first embodiment of the present invention. The processing is described below in accordance with the functional configuration of the undriven-object movement-amount estimation unit 12 in FIG. 4.

First, at Step S151, the undriven-object state-amount addition unit 121, the undriven-object state-amount update unit 122, and the undriven-object state-amount holding unit 123 receive an undriven-object state amount estimation parameter from the movement-amount estimation-parameter input unit 52. Next, at Step S152, the undriven-object state-amount holding unit 123 transmits an initial value of the undriven-object state amount to the correction-amount calculation unit 13.

Thereafter, at Step S153, whether there is a drive signal input to the drive-signal input unit 51 is checked. When there is not a drive signal input to the drive-signal input unit 51, that is, in a case of NO at Step S153, the entire processing is ended.

In contrast, when there is a drive signal input to the drive-signal input unit 51, that is, in a case of YES at Step S153, the undriven-object state-amount addition unit 121 receives the drive signal from the drive-signal input unit 51 and the correction amount from the correction-amount calculation unit 13, and calculates the amount of change in undriven-object state amount caused by a signal obtained by subtracting the correction amount from the drive signal at Step S154. At the time of this calculation, the undriven-object state amount estimation parameter having been received at Step S151 is used.

Next, at Step S155, the undriven-object state-amount update unit 122 receives the undriven-object state amount from the undriven-object state-amount holding unit 123, and calculates an updated value of the undriven-object state amount at the next time in a case where there is not an input signal.

At Step S156, the undriven-object state-amount holding unit 123 stores therein the undriven-object state amount that is the sum of the amount of change in undriven-object state amount and the updated value of the undriven-object state amount at the next time in a case where there is not an input signal.

Thereafter, at Step S157, the undriven-object state-amount holding unit 123 transmits the undriven-object state amount to the correction-amount calculation unit 13. Upon completion of the above steps, the processing in the undriven-object movement-amount estimation unit 12 is ended.

Figure 8:
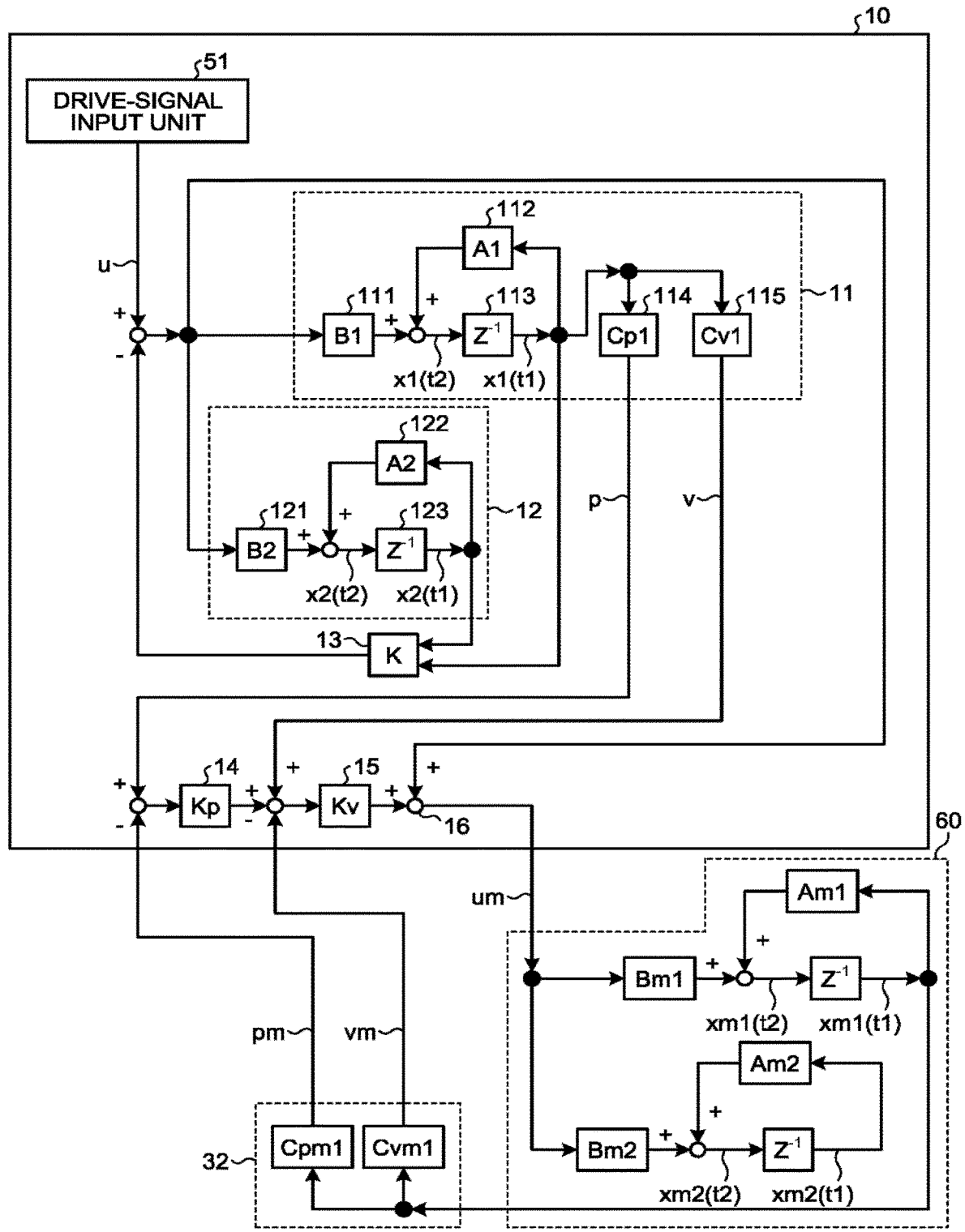
FIG. 8 is a block diagram illustrating a functional configuration of the numerical control device according to the first embodiment of the present invention, which is represented using state space models.

Effects of the vibration suppression processing obtained in the present embodiment are described below. FIG. 8 is a block diagram illustrating the functional configuration of the numerical control device according to the first embodiment of the present invention, which is represented using state space models. FIG. 8 omits illustrations of the movement-amount estimation-parameter input unit 52 and the feedback-parameter input unit 53 in FIG. 2. The internal constituent elements of the drive-shaft movement-amount estimation unit 11, which are illustrated in FIG. 3, are represented by state space models. The internal constituent elements of the undriven-object movement-amount estimation unit 12, which are illustrated in FIG. 4, are represented by state space models. Further, an interaction 60 between the drive shaft 31, a tool, and a workpiece is represented at a location to which a correction signal is output from the correction-signal output unit 16. The interaction 60 is represented by state space models Am1, Bm1, Am2, and Bm2. Position detection performed by the encoder 32 is represented by Cpm1, while velocity detection performed by the encoder 32 is represented by Cvm1.

In FIG. 8, constituent elements corresponding to the constituent elements described in FIGS. 2 to 4 are denoted by like reference signs. Am1 and Bm1 are the state space models representing a relation between a drive force and operation of the drive shaft 31. Am2 and Bm2 are the state space models representing a relation between a drive force and a relative displacement that is a difference in displacement between a tool and a workpiece caused by the drive force of the drive shaft 31.

Further, in FIG. 8, a signal x1($ti$) indicates a drive-shaft state amount at a time ti (i=1, 2), while a signal x2($ti$) indicates an undriven-object state amount at the time ti. A signal u indicates a drive signal. A signal p indicates an estimated drive-shaft position. A signal v indicates an estimated drive-shaft velocity. A signal um indicates a corrected drive signal output by the correction-signal output unit 16. A signal xm1($ti$) indicates an internal state amount of the drive shaft 31 at the time ti. A signal xm2($ti$) indicates a state amount of the relative displacement that is a difference in displacement between a tool and a workpiece at the time ti. A signal pm indicates a drive-shaft position detected by the encoder 32. A signal vm indicates a drive-shaft velocity detected by the encoder 32.

The respective signals transmitted through signal lines in FIG. 8 have relations expressed by the following formulae (1) to (4).

$$x1(t2) = A1 \cdot x1(t1) + B1 \cdot u \tag{1}$$

$$x2(t2) = A2 \cdot x2(t1) + B2 \cdot u \tag{2}$$

$$p = Cp1 \cdot x1(t1) \tag{3}$$

$$v = Cv1 \cdot x1(t1) \tag{4}$$

By defining the following formulae (5) to (9), the formulae (1) to (4) can be collectively expressed into a form of formulae (10) to (12) below.

$$x(t1) = \begin{pmatrix} x1(t1) \\ x2(t1) \end{pmatrix} \qquad \text{[Formula 1]}$$

$$A = \begin{pmatrix} A1 & 0 \\ 0 & A2 \end{pmatrix} \qquad \text{[Formula 2]}$$

$$B = \begin{pmatrix} B1 \\ B2 \end{pmatrix} \qquad \text{[Formula 3]}$$

$$Cp = (Cp1 \quad 0) \tag{8}$$

$$Cv = (Cv1 \quad 0) \tag{9}$$

$$x(t2) = A \cdot x(t1) + B \cdot u \tag{10}$$

$$p = Cp \cdot x(t1) \tag{11}$$

$$v = Cv \cdot x(t1) \tag{12}$$

Figure 9:
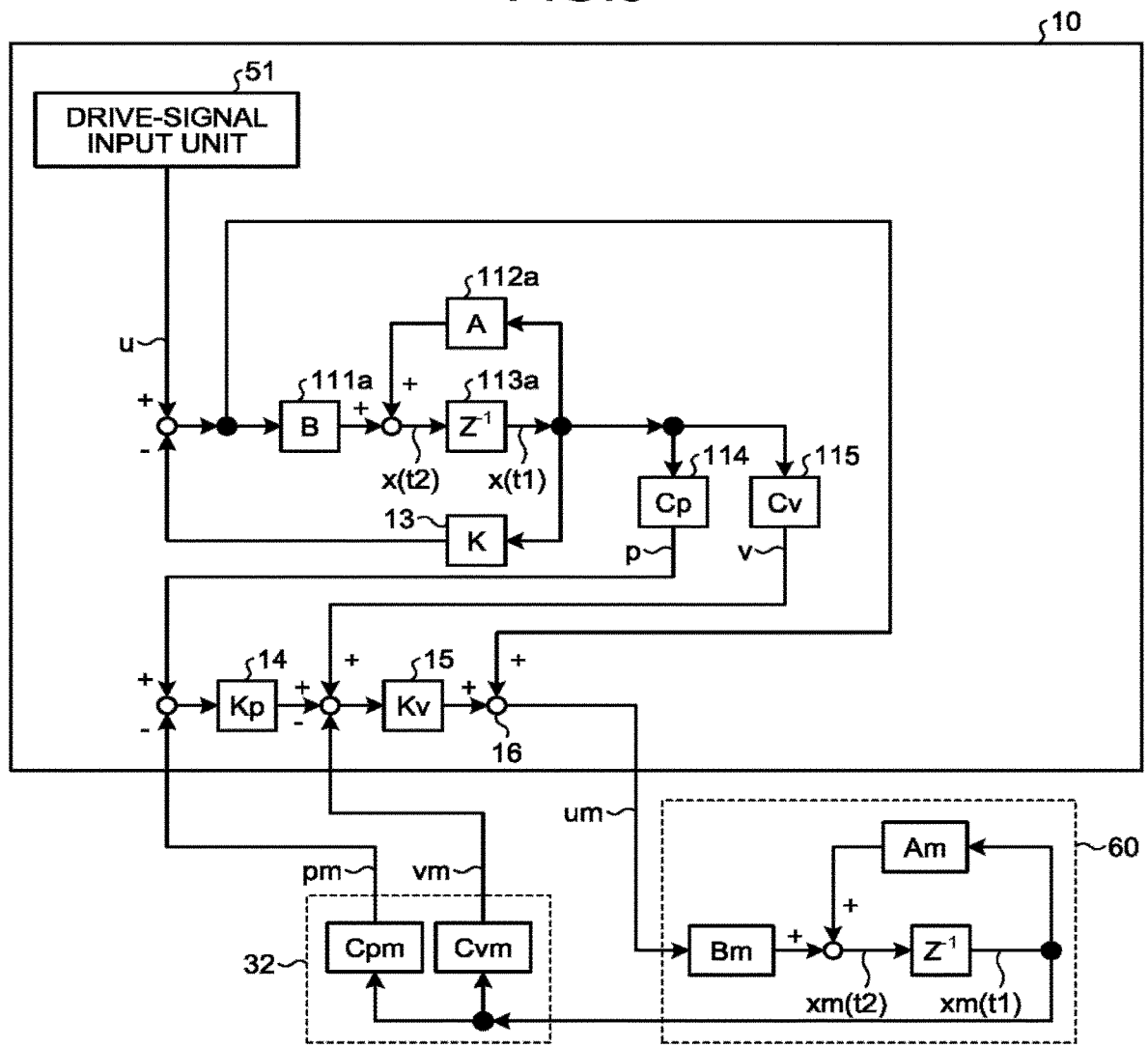
FIG. 9 is a block diagram illustrating a functional configuration of the numerical control device according to the first embodiment of the present invention, which is represented using state space models.

FIG. 9 is a block diagram illustrating the functional configuration of the numerical control device according to the first embodiment of the present invention, which is represented using state space models. FIG. 9 represents the functional configuration substantially equivalent to the configuration in FIG. 8 in accordance with results of the formulae (10) to (12). FIG. 9 is a diagram to help understand the effects more easily as compared to FIG. 8. In FIG. 9, the drive-shaft state-amount addition unit 111 and the undriven-object state-amount addition unit 121 in FIG. 8 are represented as a state-amount addition unit 111a. The drive-shaft state-amount update unit 112 and the undriven-object state-amount update unit 122 in FIG. 8 are represented as a state-amount update unit 112a. The drive-shaft state-amount holding unit 113 and the undriven-object state-amount holding unit 123 in FIG. 8 are represented as a state-amount holding unit 113a. In the interaction 60 between the drive shaft 31, a tool, and a workpiece, the state space models Am1 and Am2 are represented as a state space model Am, while the state space models Bm1 and Bm2 are represented as a state space model Bm.

In FIG. 9, the internal state amount of the drive-shaft movement-amount estimation unit 11 and the undriven-object movement-amount estimation unit 12 is expressed by the following formula (13).

$$x(t2) = A \cdot x(t1) + B\{u - K \cdot x(t1)\} \quad (13)$$
$$= (A - B \cdot K) \cdot x(t1) + B \cdot u$$

A state amount xm(t2) of the drive shaft 31, a tool, and a workpiece can be transformed into a formula (14) below by expanding the following formulae.

$$\begin{aligned} p &= Cp \cdot x(t1) \\ v &= Cv \cdot x(t1) \\ pm &= Cpm \cdot xm(t1) \\ vm &= Cvm \cdot xm(t1) \\ um &= u - K \cdot x(t1) + Kv\{v - vm + Kp(p - pm)\} \\ &= u - K \cdot x(t1) + Kv(v - vm) + Kv \cdot Kp(p - pm) \\ &= u - K \cdot x(t1) + Kv\{Cv \cdot x(t1) - Cvm \cdot xm(t1)\} + \\ & \quad Kv \cdot Kp\{Cp \cdot x(t1) - Cpm \cdot xm(t1)\} \\ xm(t2) &= Am \cdot xm(t1) + Bm \cdot um \\ &= Am \: xm(t1) + Bm \cdot \\ & \begin{bmatrix} u - K \cdot x(t1) + Kv\{Cv \cdot x(t1) - Cvm \cdot xm(t1)\} + \\ Kv \cdot Kp\{Cp \cdot x(t1) - Cpm \cdot xm(t1)\} \end{bmatrix} \\ &= \{Am \cdot xm(t1) - Bm \cdot K \cdot x(t1)\} + Bm \cdot u + \\ & Bm \begin{bmatrix} Kv\{Cv \cdot x(t1) - Cvm \cdot xm(t1)\} + Kv \cdot \\ Kp\{Cp \cdot x(t1) - Cpm \cdot xm(t1)\} \end{bmatrix} \end{aligned} \quad (14)$$

Assuming that the state space model of the drive-shaft movement-amount estimation unit 11 and the undriven-object movement-amount estimation unit 12 can sufficiently approximate the target state space model of the drive shaft 31, a tool, and a workpiece, the following formulae (15) to (17) are established. As a result, the formula (14) can be expressed by the following formula (18).

$$Cv \cdot x(t1) - Cvm \cdot xm(t1) \to 0 \quad (15)$$

$$Cp \cdot x(t1) - Cpm \cdot xm(t1) \to 0 \quad (16)$$

$$\{Am \cdot xm(t1) - Bm \cdot K \cdot x(t1)\} + Bm \cdot u \to \{A \cdot x(t1) - B \cdot K \cdot x(t1)\} + B \cdot u \quad (17)$$

$$xm(t2) \to \{A \cdot x(t1) - B \cdot K \cdot x(t1)\} + B \cdot u (= x(t2)) \quad (18)$$

This indicates that the internal state amount of the drive-shaft movement-amount estimation unit 11 and the undriven-object movement-amount estimation unit 12 accurately reflects the correlation between the drive shaft 31, a tool, and a workpiece. The control law applied to the internal state amount of the drive-shaft movement-amount estimation unit 11 and the undriven-object movement-amount estimation unit 12 in the formula (13) is reflected in the correlation between the drive shaft 31, a tool, and a workpiece as expressed by the formula (18). That is, when the control law to suppress vibrations of an undriven object is applied to the internal state amount of the drive-shaft movement-amount estimation unit 11 and the undriven-object movement-amount estimation unit 12, then relative vibrations between a tool and a workpiece can be suppressed even in a real correlation between the drive shaft 31, the tool, and the workpiece.

Figure 10:
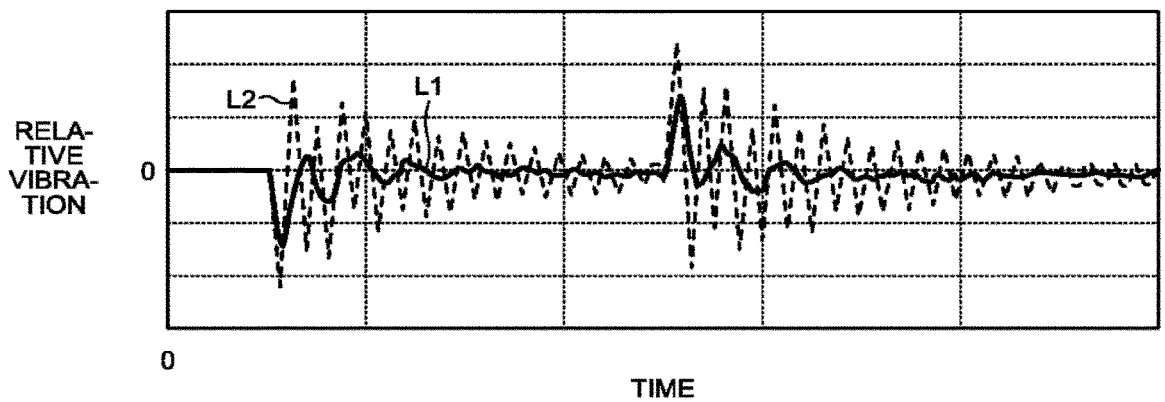
FIG. 10 is a diagram illustrating an example of a simulation result of a vibrational amplitude in a vertical direction at a relative position of a tool with respect to a workpiece when the machine tool having the schematic configuration illustrated in FIG. 1 moves the workpiece in a horizontal direction.

FIG. 10 is a diagram illustrating an example of a simulation result of a vibrational amplitude in a vertical direction at a relative position of a tool with respect to a workpiece when the machine tool having the schematic configuration illustrated in FIG. 1 moves the workpiece in a horizontal direction. In FIG. 10, the horizontal axis represents time, and the vertical axis represents relative vibrations. A curved line L1 in FIG. 10 shows a vibrational amplitude in the vertical direction when the present embodiment is applied, while a curved line L2 in FIG. 10 shows a vibrational amplitude in the vertical direction when the present embodiment is not applied. In this example, each of the bed 2, the workpiece 3, the workpiece table 4, the tool 5, the head 6, and the column 7 had its own mass, and a dynamic model was constructed in which a link between the elements has viscosity and elasticity. A simulation was performed on this dynamic model.

When the present embodiment is not applied, a vibrational amplitude in the vertical direction appears at the relative position of the tool with respect to the workpiece as shown by the curved line L2. In contrast, it is understood that when the present embodiment is applied, a vibrational amplitude in the vertical direction is sufficiently suppressed to an insignificant level as compared to the curved line L2 and disappears at a time earlier than the curved line L2 as shown by the curved line L1.

In the above explanations, the case has been described in which the position-feedback compensation unit 14 and the velocity-feedback compensation unit 15 execute only a P (Proportional) control on a position and a velocity. However, the present embodiment is not limited thereto. For example, it is also allowable to execute a current or acceleration feedback control. It is further allowable to use not only the P control, but also a PI (Proportional-Integral) control or a PID (Proportional-Integral-Differential) control.

In the above explanations, the numerical control device 10 has been described as having the configuration including the position-feedback compensation unit 14 and the velocity-feedback compensation unit 15. However, it is also allowable that the numerical control device according to the present embodiment does not include the position-feedback compensation unit 14 and the velocity-feedback compensation unit 15.

Figure 11:
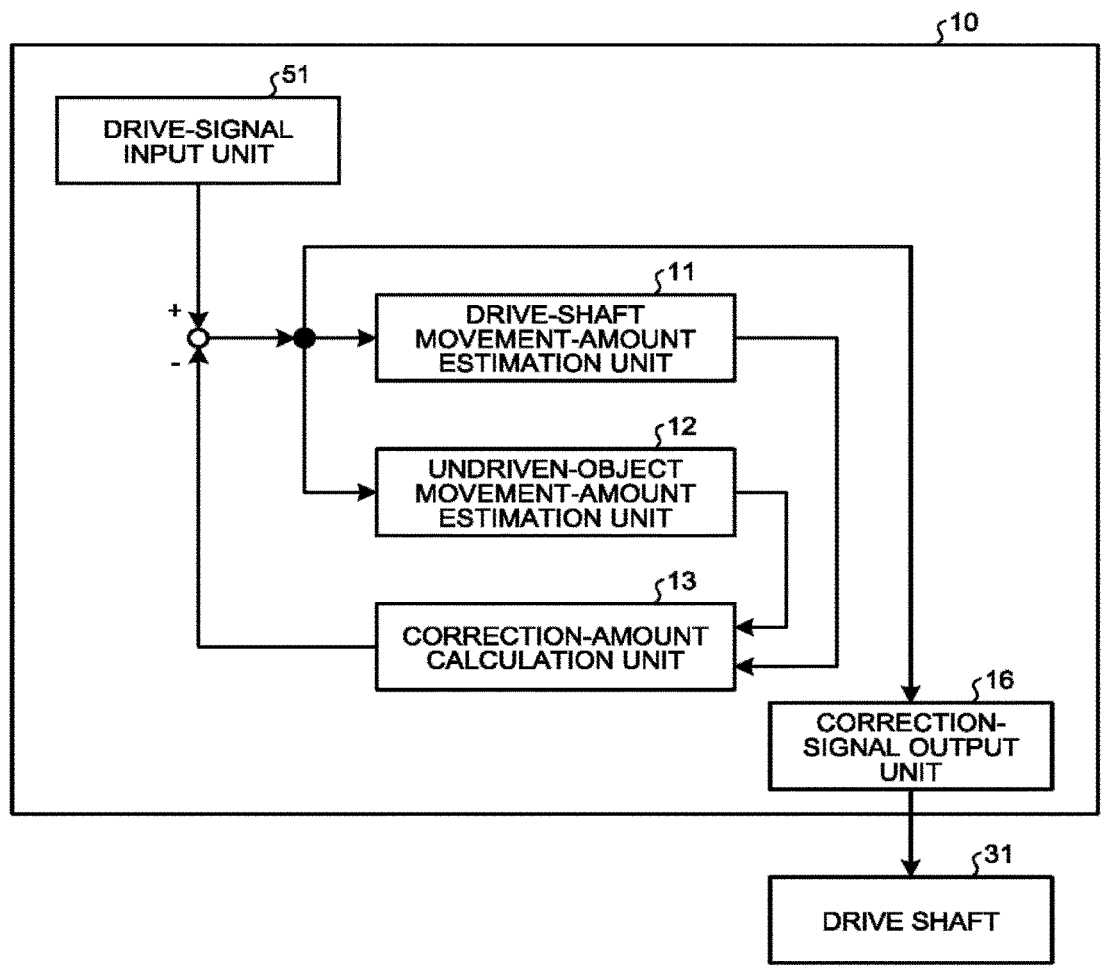
FIG. 11 is a block diagram schematically illustrating another example of the functional configuration of the numerical control device according to the first embodiment of the present invention.

FIG. 11 is a block diagram schematically illustrating another example of the functional configuration of the numerical control device according to the first embodiment of the present invention. The numerical control device 10 has a configuration in which the position-feedback compensation unit 14 and the velocity-feedback compensation unit 15 are omitted from the configuration in FIG. 2. Constituent elements identical to those illustrated in FIG. 2 are denoted by like reference signs, and thus explanations thereof are omitted. In this example, the correction-signal output unit 16 outputs a corrected drive signal to the drive shaft 31. The corrected drive signal is obtained by subtracting a correction amount output from the correction-amount calculation unit 13 from a drive signal received from the drive-signal input unit 51.

Figure 12:
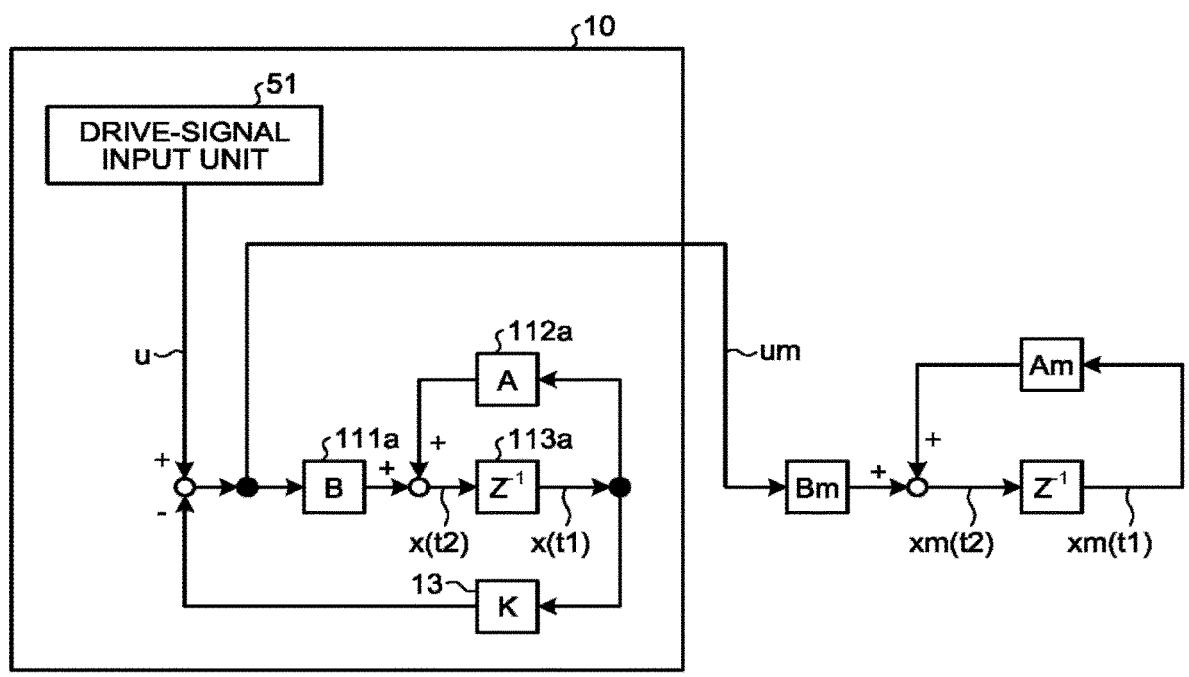
FIG. 12 is a diagram illustrating the functional configuration of the numerical control device in FIG. 11, which is represented using state space models.

FIG. 12 is a diagram illustrating the functional configuration of the numerical control device in FIG. 11, which is represented using state space models. The numerical control device 10 in FIG. 12 has a configuration in which the position-feedback compensation unit 14, the velocity-feedback compensation unit 15, the drive-shaft position extraction unit 114, the drive-shaft velocity extraction unit 115, and the encoder 32 are omitted from the configuration illustrated in FIG. 9.

In FIG. 12, there are relations expressed by the following formulae (19) to (21).

$$x(t2) = A \cdot x(t1) + B\{u - K \cdot x(t1)\}$$
$$= (A - B \cdot K) \cdot x(t1) + B \cdot u \quad (19)$$

$$um = u - K \cdot x(t1) \quad (20)$$

$$xm(t2) = Am \cdot xm(t1) + Bm \cdot um$$
$$= Am \cdot xm(t1) + Bm\{u - K \cdot x(t1)\}$$
$$= [Am \cdot xm(t1) - Bm \cdot K \cdot x(t1)] + Bm \cdot u \quad (21)$$

The following formula (22) is established assuming that the state space model of the drive-shaft movement-amount estimation unit 11 and the undriven-object movement-amount estimation unit 12 can sufficiently approximate the target state space model of the drive shaft 31, a tool, and a workpiece. As a result, the formula (21) is approximated as expressed by the following formula (23).

$$[Am \cdot xm(t1) - Bm \cdot K \cdot x(t1)] + Bm \cdot u \rightarrow [A \cdot x(t1) - B \cdot K \cdot x(t1)] + B \cdot u \quad (22)$$

$$xm(t2) \rightarrow [A \cdot x(t1) - B \cdot K \cdot x(t1)] + B \cdot u(=x(t2)) \quad (23)$$

Even in the configuration of the numerical control device 10 illustrated in FIGS. 11 and 12, which does not include the position-feedback compensation unit 14 or the velocity-feedback compensation unit 15, the same effects can still be obtained as those obtained from the configuration of the numerical control device 10 including the position-feedback compensation unit 14 and the velocity-feedback compensation unit 15 by using the formulae (19) to (23).

In the present embodiment, the functional configuration has been described using a linear state space model. However, the present embodiment is not limited thereto. A non-linear state space model may also be used.

As described above, in the first embodiment, the undriven-object movement-amount estimation unit 12 estimates an undriven-object movement amount that is a displacement of a second object that is not an operational target for the drive shaft 31 in a three dimensional space using a state space model or the like. The correction-amount calculation unit 13 calculates a correction amount so as to suppress the undriven-object movement amount using information including the undriven-object movement amount and a gain determined by an optimum regulator in advance. Due to this calculation, even in a case where a tool vibrates as a workpiece is moved, it is still possible to suppress vibrations in a direction different from the movement direction of the drive shaft 31 without providing an additional drive shaft or detector.

Specifically, the undriven-object movement amount includes at least one of the relative displacement of a tool with respect to the position of a workpiece, the relative velocity of the tool with respect to the position of the workpiece, the relative acceleration of the tool with respect to the position of the workpiece, the change in relative attitude of the tool with respect to the attitude of the workpiece, the rate of change in relative attitude of the tool with respect to the attitude of the workpiece, and the acceleration of change in relative attitude of the tool with respect to the attitude of the workpiece. This makes it possible to suppress relative vibrations between the workpiece and the tool.

An undriven-object movement amount is estimated by estimating a displacement of the undriven object in a three dimensional space in a direction different from the movement direction of the drive shaft 31. This makes it possible to suppress vibrations even in a case where a tool vibrates in a direction different from the movement direction of the drive shaft 31.

Further, the undriven-object movement-amount estimation unit 12 is constituted of a state space model in which at least one of the drive position, drive velocity, drive acceleration, and drive force, which are instructed to the drive shaft 31, is used as a part of inputs, and at least one of the displacement of the undriven object, the velocity thereof, the acceleration thereof, the change in attitude thereof, the rate of change in attitude thereof, and the acceleration of change in attitude thereof is used as a part of outputs or as a part of the internal state amount. State space models of a plurality of undriven-object movement amounts can be held. This makes it possible to simultaneously suppress vibrations in multiple directions such as vibrations in a direction that is the same as the movement direction of the drive shaft 31 and vibrations in a direction different from the movement direction of the drive shaft 31. It is also possible to suppress vibrations of multiple objects.

The numerical control device 10 includes the movement-amount estimation-parameter input unit 52 and can thus use a movement-amount estimation parameter in accordance with environmental changes, degradation of a machine tool over time, differences between individual machine tools, or other factors. As a result, it is possible to suppress vibrations generated depending on environmental changes, degradation of a machine tool over time, differences between individual machine tools, or other factors.

In the present embodiment, the example has been described in which a workpiece is moved while a tool is fixed. However, the present embodiment is not limited thereto. The present embodiment is also applicable to a case where a tool is moved while a workpiece is fixed. In the present embodiment, the example has been described in which a workpiece is machined with a tool in the machine tool 1. However, the present embodiment is not limited thereto. The present embodiment is also applicable to a case where assembly is performed with robot hands.

Second Embodiment

Figure 13:
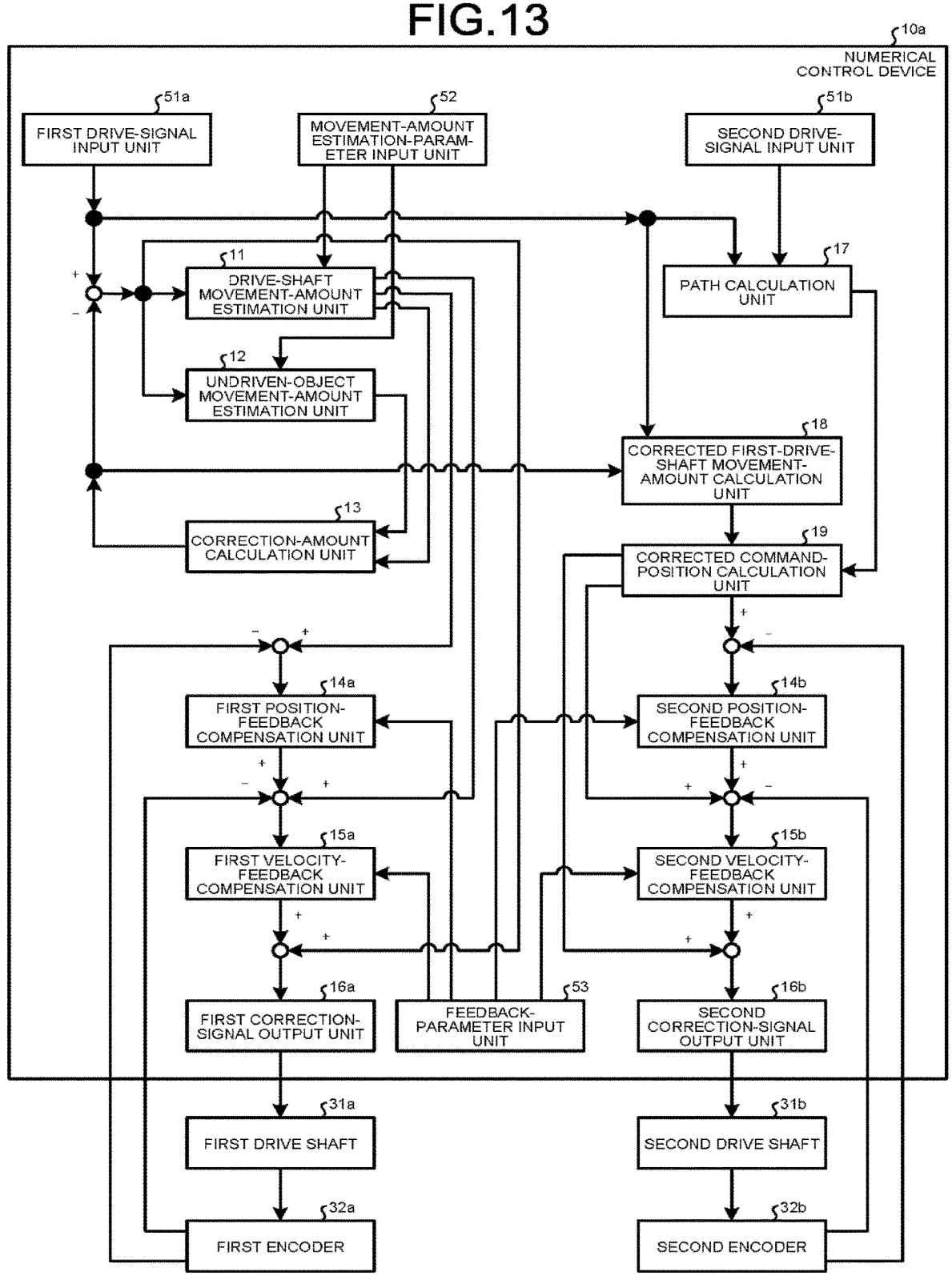
FIG. 13 is a block diagram illustrating an example of a functional configuration of a numerical control device according to a second embodiment of the present invention.

FIG. 13 is a block diagram illustrating an example of a functional configuration of a numerical control device according to a second embodiment of the present invention. A first drive shaft 31a and a second drive shaft 31b are connected to a numerical control device 10a. A first encoder 32a that detects a position and a velocity of a driven target is connected to the first drive shaft 31a. A second encoder 32b that detects a position and a velocity of a driven target is connected to the second drive shaft 31b.

The numerical control device 10a includes the drive-shaft movement-amount estimation unit 11 that is a first estimation unit to calculate an estimated movement amount of the first drive shaft 31a, the undriven-object movement-amount estimation unit 12 that is a second estimation unit to calculate an estimated movement amount of a second object in relation to movement of the first drive shaft 31a, the correction-amount calculation unit 13 that calculates a correction amount for a first drive signal, a first position-feedback compensation unit 14a that calculates a first position feedback compensation value, a first velocity-feedback compensation unit 15a that calculates a first velocity feedback compensation value, and a first correction-signal output unit 16a that calculates a first corrected drive signal.

The numerical control device 10a further includes a path calculation unit 17 to calculate a path of the first drive shaft 31a and a path of the second drive shaft 31b, a corrected first-drive-shaft movement-amount calculation unit 18 that is a first calculation unit to calculate a corrected movement amount of the first drive shaft 31a, a corrected command-position calculation unit 19 that is a second calculation unit to calculate a position on the path corresponding to a corrected command to the first drive shaft 31a and calculate a position, a velocity, and an acceleration of the second drive shaft 31b corresponding to the position on the path, a second position-feedback compensation unit 14b that calculates a second position feedback compensation value, a second velocity-feedback compensation unit 15b that calculates a second velocity feedback compensation value, and a second correction-signal output unit 16b that calculates a second corrected drive signal.

Furthermore, the numerical control device 10a includes a first drive-signal input unit 51a that receives a first drive signal for driving the first drive shaft 31a, a second drive-signal input unit 51b that receives a second drive signal for driving the second drive shaft 31b, the movement-amount estimation-parameter input unit 52 that receives a parameter to represent a model used to estimate a movement amount of a first object to be moved by the first drive shaft 31a, and a parameter to represent a model used to estimate a movement amount of the second object not to be driven in relation to the movement of the first drive shaft 31a, and the feedback-parameter input unit 53 that receives inputs of position and velocity feedback parameters.

The drive-shaft movement-amount estimation unit 11 estimates a drive-shaft movement amount that is a first movement amount of the first object by using a model. The model is determined in advance on the basis of a parameter to represent a model used to estimate a displacement of the first drive shaft 31a, the parameter being received from the movement-amount estimation-parameter input unit 52, a first drive signal received from the first drive-signal input unit 51a, and a correction amount received from the correction-amount calculation unit 13. In the second embodiment, examples of the drive-shaft movement amount also include an estimated drive-shaft position and an estimated drive-shaft velocity. The drive-shaft movement-amount estimation unit 11 transmits the calculated estimated drive-shaft position and estimated drive-shaft velocity to the correction-amount calculation unit 13, transmits the calculated estimated drive-shaft position to the first position-feedback compensation unit 14a, and transmits the calculated estimated drive-shaft velocity to the first velocity-feedback compensation unit 15a.

The undriven-object movement-amount estimation unit 12 estimates an undriven-object movement amount that is a second movement amount by using a model. The model is determined in advance on the basis of a parameter to represent a model received from the movement-amount estimation-parameter input unit 52 and used to estimate an undriven-object movement amount, a first drive signal received from the first drive-signal input unit 51a, and a correction amount received from the correction-amount calculation unit 13. The undriven-object movement-amount estimation unit 12 transmits the calculated undriven-object movement amount to the correction-amount calculation unit 13.

The correction-amount calculation unit 13 calculates a correction amount for a drive signal in accordance with a model determined in advance on the basis of a drive-shaft movement amount received from the drive-shaft movement-amount estimation unit 11, and an undriven-object movement amount received from the undriven-object movement-amount estimation unit 12. The correction-amount calculation unit 13 transmits the calculated correction amount to the drive-shaft movement-amount estimation unit 11, the undriven-object movement-amount estimation unit 12, the first correction-signal output unit 16a, and the corrected first-drive-shaft movement-amount calculation unit 18. In the correction amount calculation, a feedback gain is calculated in advance by optimal regulator design on the basis of the model of the undriven-object movement-amount estimation unit 12 so as to multiply the undriven-object movement amount by the calculated feedback gain. However, the present embodiment is not limited thereto.

The first position-feedback compensation unit 14a calculates a first position feedback compensation value in accordance with a model determined in advance on the basis of a parameter received from the feedback-parameter input unit 53 and used for position feedback compensation, an estimated drive-shaft position received from the drive-shaft movement-amount estimation unit 11, and a first feedback position received from the first encoder 32a. The first position-feedback compensation unit 14a transmits the calculated first position feedback compensation value to the first velocity-feedback compensation unit 15a.

The first velocity-feedback compensation unit 15a calculates a first velocity feedback compensation value in accordance with a model determined in advance on the basis of a parameter received from the feedback-parameter input unit 53 and used for velocity feedback compensation, an estimated drive-shaft velocity received from the drive-shaft movement-amount estimation unit 11, a first position feedback compensation value received from the first position-feedback compensation unit 14a, and a first feedback velocity received from the first encoder 32a. The first velocity-feedback compensation unit 15a transmits the calculated first velocity feedback compensation value to the first correction-signal output unit 16a.

The first correction-signal output unit 16a calculates a first corrected drive signal on the basis of a first drive signal received from the first drive-signal input unit 51a, a correction amount received from the correction-amount calculation unit 13, and a first velocity feedback compensation value received from the first velocity-feedback compensation unit 15a. The first correction-signal output unit 16a transmits the calculated first corrected drive signal to the drive unit that drives the first drive shaft 31a.

The path calculation unit 17 calculates a path of the first drive shaft 31a and a path of the second drive shaft 31b in accordance with a model determined in advance on the basis of the first drive signal to the first drive shaft 31a received from the first drive-signal input unit 51a, and the second drive signal to the second drive shaft 31b received from the second drive-signal input unit 51b. The path calculation unit 17 transmits the calculated paths to the corrected command-position calculation unit 19.

The corrected first-drive-shaft movement-amount calculation unit 18 calculates a corrected movement amount of the first drive shaft 31a in accordance with a model determined in advance on the basis of the first drive signal to the first drive shaft 31a received from the first drive-signal input unit 51a, and a correction amount received from the correction-amount calculation unit 13. The corrected first-drive-shaft movement-amount calculation unit 18 transmits the calculated corrected movement amount of the first drive shaft 31a to the corrected command-position calculation unit 19.

The corrected command-position calculation unit 19 calculates a position on the path corresponding to a corrected command to the first drive shaft 31*a* in accordance with a model determined in advance on the basis of a path of the first drive shaft 31*a* and a path of the second drive shaft 31*b*, which are both received from the path calculation unit 17, and a corrected movement amount of the first drive shaft 31*a* received from the corrected first-drive-shaft movement-amount calculation unit 18. The corrected command-position calculation unit 19 further calculates a position, a velocity, and an acceleration of the second drive shaft 31*b* corresponding to the position on the path. The corrected command-position calculation unit 19 transmits the position of the second drive shaft 31*b* corresponding to the position on the path to the second position-feedback compensation unit 14*b*, transmits the velocity of the second drive shaft 31*b* corresponding to the position on the path to the second velocity-feedback compensation unit 15*b*, and transmits the acceleration of the second drive shaft 31*b* corresponding to the position on the path to the second correction-signal output unit 16*b*.

The second position-feedback compensation unit 14*b* calculates a second position feedback compensation value in accordance with a model determined in advance on the basis of a parameter received from the feedback-parameter input unit 53 and used for position feedback compensation, a position of the second drive shaft 31*b* on the path received from the corrected command-position calculation unit 19, and a second feedback position received from the second encoder 32*b*. The second position-feedback compensation unit 14*b* transmits the calculated second position feedback compensation value to the second velocity-feedback compensation unit 15*b*.

The second velocity-feedback compensation unit 15*b* calculates a second velocity feedback compensation value in accordance with a model determined in advance on the basis of a parameter received from the feedback-parameter input unit 53 and used for velocity feedback compensation, a velocity of the second drive shaft 31*b* on the path received from the corrected command-position calculation unit 19, a second position feedback compensation value received from the second position-feedback compensation unit 14*b*, and a second feedback velocity received from the second encoder 32*b*. The second velocity-feedback compensation unit 15*b* transmits the calculated second velocity feedback compensation value to the second correction-signal output unit 16*b*.

The second correction-signal output unit 16*b* calculates a second corrected drive signal on the basis of an acceleration of the second drive shaft 31*b* corresponding to the position on the path received from the corrected command-position calculation unit 19, and a second velocity feedback compensation value received from the second velocity-feedback compensation unit 15*b*. The second correction-signal output unit 16*b* transmits the calculated second corrected drive signal to the drive unit that drives the second drive shaft 31*b*.

The first drive-signal input unit 51*a* receives an input of a first drive signal to the first drive shaft 31*a*, and transmits the first drive signal to the drive-shaft movement-amount estimation unit 11, the undriven-object movement-amount estimation unit 12, the first correction-signal output unit 16*a*, the path calculation unit 17, and the corrected first-drive-shaft movement-amount calculation unit 18.

The second drive-signal input unit 51*b* receives an input of a drive signal to the second drive shaft 31*b*, and transmits the second drive signal to the path calculation unit 17.

The movement-amount estimation-parameter input unit 52 receives an input of an undriven-object movement amount estimation parameter that represents a model used to estimate an undriven-object movement amount. The movement-amount estimation-parameter input unit 52 transmits the undriven-object movement amount estimation parameter to the undriven-object movement-amount estimation unit 12. It is also allowable that the movement-amount estimation-parameter input unit 52 receives the drive-shaft movement amount estimation parameter that represents a model used to estimate a drive-shaft movement amount, and transmits the drive-shaft movement amount estimation parameter to the drive-shaft movement-amount estimation unit 11.

The feedback-parameter input unit 53 receives an input of a first position compensation parameter used for position feedback compensation for the first drive shaft 31*a*, an input of a first velocity compensation parameter used for velocity feedback compensation for the first drive shaft 31*a*, an input of a second position compensation parameter used for position feedback compensation for the second drive shaft 31*b*, and an input of a second velocity compensation parameter used for velocity feedback compensation for the second drive shaft 31*b*. The feedback-parameter input unit 53 transmits the first position compensation parameter to the first position-feedback compensation unit 14*a*, transmits the first velocity compensation parameter to the first velocity-feedback compensation unit 15*a*, transmits the second position compensation parameter to the second position-feedback compensation unit 14*b*, and transmits the second velocity compensation parameter to the second velocity-feedback compensation unit 15*b*.

The first drive shaft 31*a* receives a first corrected drive signal from the first correction-signal output unit 16*a*, and the second drive shaft 31*b* receives a second corrected drive signal from the second correction-signal output unit 16*b*. The first and second drive shafts 31*a* and 31*b* then drive the workpiece 3 or the tool 5. The first drive shaft 31*a* transmits movement or rotation of the first drive shaft 31*a* to the first encoder 32*a*, and the second drive shaft 31*b* transmits movement or rotation of the second drive shaft 31*b* to the second encoder 32*b*.

The first encoder 32*a* obtains a first feedback position and a first feedback velocity of the first drive shaft 31*a* on the basis of a displacement generated between a movable portion and a fixed portion (both are not illustrated) inside the first encoder 32*a* as the first drive shaft 31*a* is operated. The first encoder 32*a* transmits the first feedback position to the first position-feedback compensation unit 14*a*, and transmits the first feedback velocity to the first velocity-feedback compensation unit 15*a*.

In the same manner as the first encoder 32*a*, the second encoder 32*b* obtains a second feedback position and a second feedback velocity of the second drive shaft 31*b*, transmits the second feedback position to the second position-feedback compensation unit 14*b*, and transmits the second feedback velocity to the second velocity-feedback compensation unit 15*b*.

The further detailed functional configurations of the drive-shaft movement-amount estimation unit 11 and the undriven-object movement-amount estimation unit 12 are respectively the same as those illustrated in FIGS. 3 and 4 in the first embodiment. However, in the second embodiment, the drive-shaft state-amount addition unit 111 in the drive-shaft movement-amount estimation unit 11 receives a first drive signal from the first drive-signal input unit 51*a*. The drive-shaft position extraction unit 114 in the drive-shaft movement-amount estimation unit 11 transmits an estimated drive-shaft position to the first position-feedback compensation unit 14*a*. The drive-shaft velocity extraction unit 115 in the drive-shaft movement-amount estimation unit 11 transmits an estimated drive-shaft velocity to the first velocity-feedback compensation unit 15a.

In the second embodiment, the undriven-object state-amount addition unit 121 in the undriven-object movement-amount estimation unit 12 receives a first drive signal from the first drive-signal input unit 51a.

Figure 14:
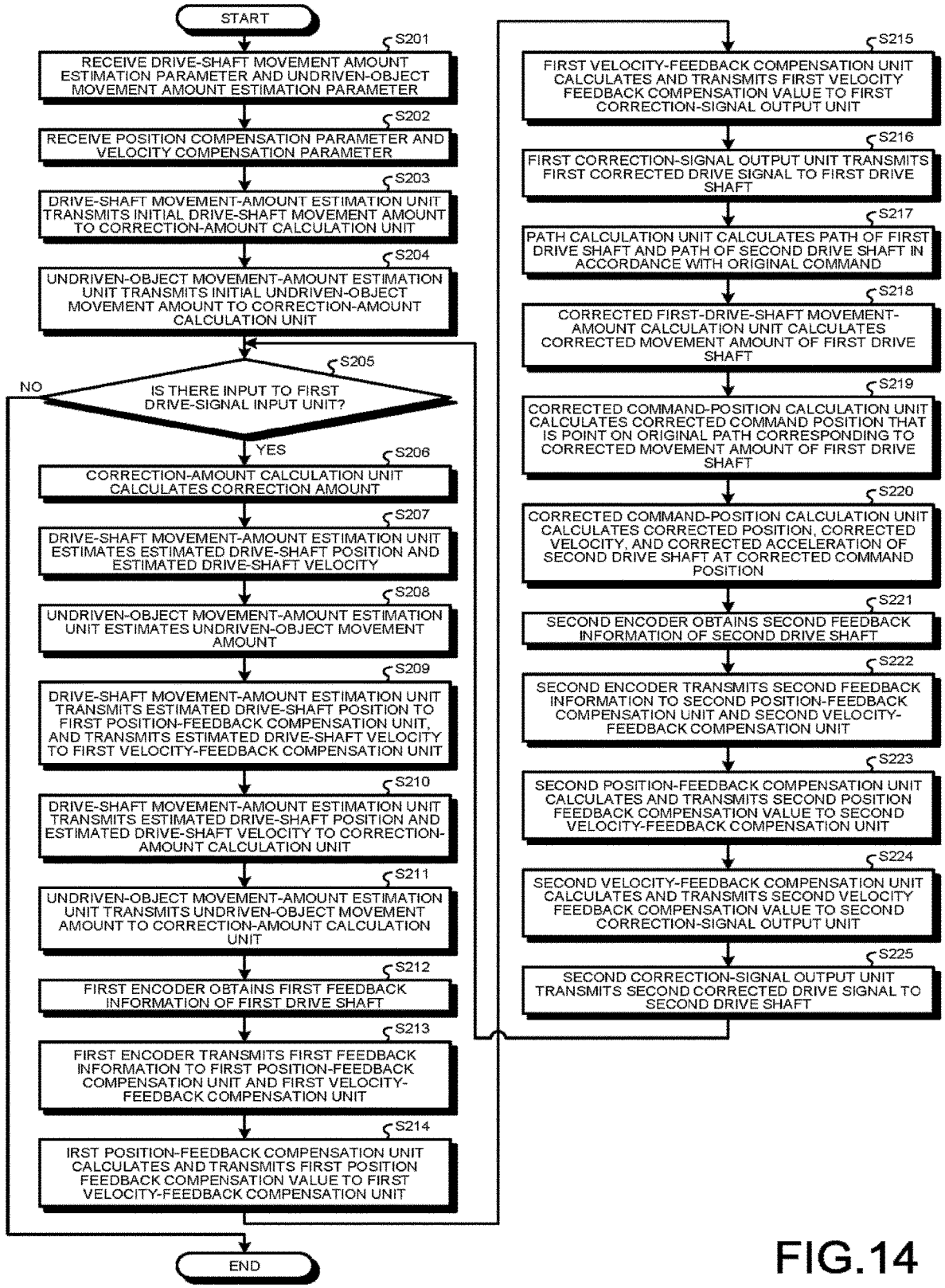
FIG. 14 is a flowchart illustrating an example of a procedure for vibration suppression processing performed by the numerical control device according to the second embodiment of the present invention.

Next, vibration suppression processing in the numerical control device according to the second embodiment is described. FIG. 14 is a flowchart illustrating an example of a procedure for vibration suppression processing performed by the numerical control device according to the second embodiment of the present invention. Description is herein given of a processing flow in the functional configuration of the numerical control device 10a in FIG. 13.

First, at Steps S201 to S204, the same processes as those at Steps S101 to S104 in FIG. 5 in the first embodiment are performed. That is, the drive-shaft movement-amount estimation unit 11 and the undriven-object movement-amount estimation unit 12 receive the drive-shaft movement amount estimation parameter and the undriven-object movement amount estimation parameter, respectively, from the movement-amount estimation-parameter input unit 52. The first position-feedback compensation unit 14a and the second position-feedback compensation unit 14b receive a position compensation parameter from the feedback-parameter input unit 53. The first velocity-feedback compensation unit 15a and the second velocity-feedback compensation unit 15b receive a velocity compensation parameter from the feedback-parameter input unit 53. The position compensation parameter includes a first position compensation parameter and a second position compensation parameter. The velocity compensation parameter includes a first velocity compensation parameter and a second velocity compensation parameter. Subsequently, the drive-shaft movement-amount estimation unit 11 transmits an initial drive-shaft movement amount to the correction-amount calculation unit 13. The undriven-object movement-amount estimation unit 12 transmits an initial undriven-object movement amount to the correction-amount calculation unit 13.

Next, at Step S205, whether there is a first drive signal input to the first drive-signal input unit 51a is checked. When there is not a first drive signal input to the first drive-signal input unit 51a, that is, in a case of NO at Step S205, the entire processing is ended.

In contrast, when there is a first drive signal input to the first drive-signal input unit 51a, that is, in a case of YES at Step S205, the correction-amount calculation unit 13 calculates a correction amount on the basis of the drive-shaft movement amount and the undriven-object movement amount at Step S206.

Subsequently, at Step S207, the drive-shaft movement-amount estimation unit 11 estimates an estimated drive-shaft position and an estimated drive-shaft velocity on the basis of the first drive signal received from the first drive-signal input unit 51a and the correction amount calculated at Step S206. At Step S208, the undriven-object movement-amount estimation unit 12 estimates an undriven-object movement amount on the basis of the first drive signal and the correction amount.

Thereafter, at Step S209, the drive-shaft movement-amount estimation unit 11 transmits the estimated drive-shaft position to the first position-feedback compensation unit 14a, and transmits the estimated drive-shaft velocity to the first velocity-feedback compensation unit 15a. At Step S210, the drive-shaft movement-amount estimation unit 11 transmits the estimated drive-shaft position and the estimated drive-shaft velocity that have been estimated to the correction-amount calculation unit 13. Further, at Step S211, the undriven-object movement-amount estimation unit 12 transmits the estimated undriven-object movement amount to the correction-amount calculation unit 13. These estimated drive-shaft position, estimated drive-shaft velocity, and estimated undriven-object movement amount are used when the next drive signal is input.

Next, at Step S212, the first encoder 32a obtains first feedback information of the first drive shaft 31a. The first feedback information includes a first feedback position and a first feedback velocity. Thereafter, at Step S213, the first encoder 32a transmits the first feedback information of the first drive shaft 31a to the first position-feedback compensation unit 14a and the first velocity-feedback compensation unit 15a. In this example, the first encoder 32a transmits the first feedback position to the first position-feedback compensation unit 14a, and transmits the first feedback velocity to the first velocity-feedback compensation unit 15a.

Subsequently, at Step S214, the first position-feedback compensation unit 14a calculates a first position feedback compensation value on the basis of the estimated drive-shaft position received at Step S209, the first feedback position received at Step S213, and the first position compensation parameter received at Step S202. The first position-feedback compensation unit 14a then transmits the calculated first position feedback compensation value to the first velocity-feedback compensation unit 15a.

Thereafter, at Step S215, the first velocity-feedback compensation unit 15a calculates a first velocity feedback compensation value on the basis of the estimated drive-shaft velocity received at Step S209, the first feedback velocity received at Step S213, the first position feedback compensation value received at Step S214, and the first velocity compensation parameter received at Step S202. The first velocity-feedback compensation unit 15a then transmits the calculated first velocity feedback compensation value to the first correction-signal output unit 16a.

Subsequently, the first correction-signal output unit 16a calculates a first corrected drive signal by subtracting the correction amount calculated by the correction-amount calculation unit 13 from the first drive signal received from the first drive-signal input unit 51a, and further adding the first velocity feedback compensation value calculated by the first velocity-feedback compensation unit 15a to the subtraction result. At Step S216, the first correction-signal output unit 16a transmits the first corrected drive signal to the first drive shaft 31a.

Next, at Step S217, the path calculation unit 17 calculates a path of the first drive shaft 31a and a path of the second drive shaft 31b in accordance with an original command. The original command is a drive signal that is not corrected. In this example, the original command includes a first drive signal to the first drive shaft 31a received from the first drive-signal input unit 51a and a second drive signal to the second drive shaft 31b received from the second drive-signal input unit 51b.

Thereafter, at Step S218, the corrected first-drive-shaft movement-amount calculation unit 18 receives a first drive signal to the first drive shaft 31a from the first drive-signal input unit 51a, and receives a correction amount from the correction-amount calculation unit 13 to calculate a corrected movement amount of the first drive shaft 31a.

Subsequently, the corrected command-position calculation unit 19 receives the path of the first drive shaft 31a and the path of the second drive shaft 31b from the path calculation unit 17, and receives the corrected movement amount of the first drive shaft 31a from the corrected first-drive-shaft movement-amount calculation unit 18. At Step S219, on the basis of these pieces of information, the corrected command-position calculation unit 19 calculates a corrected command position that is a point on the path corresponding to the corrected movement amount of the first drive shaft 31a. Further, at Step S220, the corrected command-position calculation unit 19 calculates a corrected position, a corrected velocity, and a corrected acceleration of the second drive shaft 31b at the corrected command position.

Next, at Step S221, the second encoder 32b obtains second feedback information of the second drive shaft 31b. The second feedback information includes a second feedback position and a second feedback velocity of the second drive shaft 31b. Thereafter, at Step S222, the second encoder 32b transmits the second feedback information of the second drive shaft 31b to the second position-feedback compensation unit 14b and the second velocity-feedback compensation unit 15b. In this example, the second encoder 32b transmits the second feedback position to the second position-feedback compensation unit 14b, and transmits the second feedback velocity to the second velocity-feedback compensation unit 15b.

Subsequently, at Step S223, the second position-feedback compensation unit 14b calculates a second position feedback compensation value on the basis of the corrected position of the second drive shaft 31b calculated at Step S220, the second feedback position received at Step S222, and the second position compensation parameter received at Step S202. The second position-feedback compensation unit 14b then transmits the calculated second position feedback compensation value to the second velocity-feedback compensation unit 15b.

Thereafter, at Step S224, the second velocity-feedback compensation unit 15b calculates a second velocity parameter compensation value on the basis of the corrected velocity of the second drive shaft 31b calculated at Step S220, the second feedback velocity received at Step S222, the second position feedback compensation value calculated at Step S223, and the second velocity compensation parameter received at Step S202. The second velocity-feedback compensation unit 15b then transmits the calculated second velocity feedback compensation value to the second correction-signal output unit 16b.

Next, the second correction-signal output unit 16b calculates a second corrected drive signal by adding the second velocity feedback compensation value to the corrected acceleration of the second drive shaft 31b calculated at Step S220, and transmits the calculated second corrected drive signal to the second drive shaft 31b. Thereafter, the process returns to Step S205 to repeat processes of Steps S206 to 3225 during a period for which a first drive signal is input.

The detailed processing in the drive-shaft movement-amount estimation unit 11 is the same as that illustrated by the flowchart in FIG. 6 in the first embodiment. The detailed processing in the undriven-object movement-amount estimation unit 12 is the same as that illustrated by the flowchart in FIG. 7 in the first embodiment.

As described above, in the second embodiment, in a case of correcting a first drive signal to the first drive shaft 31a to suppress vibrations, the numerical control device 10a corrects a command to the second drive shaft 31b such that the first drive shaft 31a and the second drive shaft 31b stay on their respective paths formed in accordance with the original command that is the first drive signal and the second drive signal to the second drive shaft 31b. Due to this correction, while obtaining the vibration suppression effects, the numerical control device 10a achieves effects of being able to realize the paths formed by the first drive shaft 31a and the second drive shaft 31b in accordance with the original command.

In the above descriptions, a command to the second drive shaft 31b is corrected in conformity with the first drive shaft 31a. However, the present embodiment is not limited thereto. In a case where in the machine tool 1 including a plurality of drive shafts 31, there are additional drive shafts such as a third drive shaft and a fourth drive shaft, it is also allowable to correct commands to the third drive shaft and the fourth drive shaft in conformity with the first drive shaft 31a.

In the present embodiment, the example has been described in which a workpiece is machined with a tool in the machine tool 1. However, the present embodiment is not limited thereto. The present embodiment is also applicable to a case where assembly is performed with robot hands.

Figure 15:
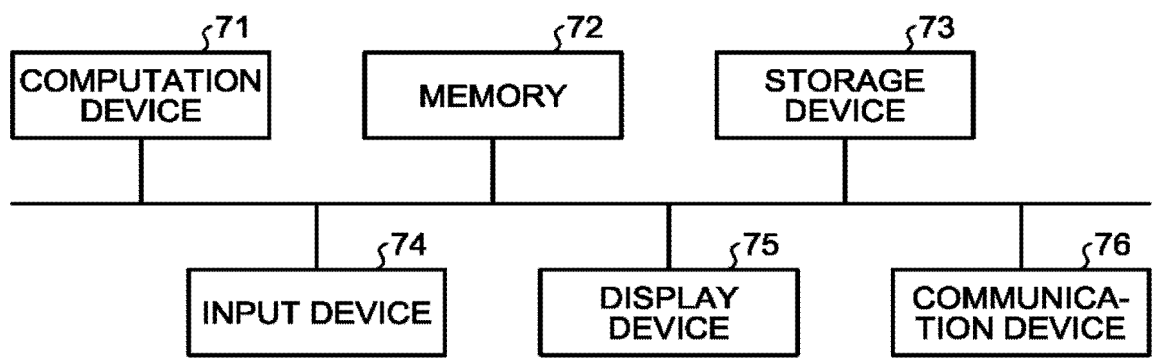
FIG. 15 is a diagram illustrating an example of a hardware configuration of the numerical control devices according to the first and second embodiments when the functions of each of the numerical control devices are implemented by a computer.

FIG. 15 is a diagram illustrating an example of a hardware configuration of the numerical control devices according to the first and second embodiments when the functions of each of the numerical control devices are implemented by a computer. Each of the numerical control devices 10 and 10a includes a computation device 71 that performs computation processing such as a CPU (Central Processing Unit), a memory 72 used as a work area for the computation device 71, a storage device 73 that stores therein software such as a machining program, an input device 74 that is an input interface between the computer and a user, a display device 75 that displays information to a user, and a communication device 76 having a function of communicating with the machine tool 1.

Functions of the drive-shaft movement-amount estimation unit 11, the undriven-object movement-amount estimation unit 12, the correction-amount calculation unit 13, the position-feedback compensation unit 14, the first position-feedback compensation unit 14a, the second position-feedback compensation unit 14b, the velocity-feedback compensation unit 15, the first velocity-feedback compensation unit 15a, the second velocity-feedback compensation unit 15b, the correction-signal output unit 16, the first correction-signal output unit 16a, the second correction-signal output unit 16b, the path calculation unit 17, the corrected first-drive-shaft movement-amount calculation unit 18, and the corrected command-position calculation unit 19 illustrated in FIG. 2 and FIG. 13 are implemented by software, firmware, or a combination of the software and the firmware. The software or firmware is described as a program and stored in the memory 72. The computation device 71 reads and executes the program stored in the memory 72 to thereby implement the function of each unit. The memory 72 corresponds to a nonvolatile or volatile semiconductor memory such as a RAM (Random Access Memory), a ROM (Read Only Memory), a flash memory, or an EEPROM (Electrically Erasable Programmable ROM), a magnetic disk, a flexible disk, an optical disk, a compact disk, or a DVD (Digital Versatile Disk).

The configurations described in the above embodiments are only examples of the content of the present invention. The configurations can be combined with other well-known techniques, and a part of each configuration can be omitted or modified without departing from the scope of the present invention.

REFERENCE SIGNS LIST 1 machine tool, 2 bed, 3 workpiece, 4 workpiece table, 5 tool, 6 head, 7 column, 10, 10a numerical control device, 11 drive-shaft movement-amount estimation unit, 12 undriven-object movement-amount estimation unit, 13 correction-amount calculation unit, 14 position-feedback compensation unit, 14a first position-feedback compensation unit, 14b second position-feedback compensation unit, 15 velocity-feedback compensation unit, 15a first velocity-feedback compensation unit, 15b second velocity-feedback compensation unit, 16 correction-signal output unit, 16a first correction-signal output unit, 16b second correction-signal output unit, 17 path calculation unit, 18 corrected first-drive-shaft movement-amount calculation unit, 19 corrected command-position calculation unit, 31 drive shaft, 31a first drive shaft, 31b second drive shaft, 32 encoder, 32a first encoder, 32b second encoder, 51 drive-signal input unit, 51a first drive-signal input unit, 51b second drive-signal input unit, 52 movement-amount estimation-parameter input unit, 53 feedback-parameter input unit, 111 drive-shaft state-amount addition unit, 112 drive-shaft state-amount update unit, 113 drive-shaft state-amount holding unit, 114 drive-shaft position extraction unit, 115 drive-shaft velocity extraction unit, 121 undriven-object state-amount addition unit, 122 undriven-object state-amount update unit, 123 undriven-object state-amount holding unit.

The invention claimed is:

1. A numerical control device comprising:
   circuitry configured to
   estimate a first movement amount of a first object that is a target to be moved by a first drive shaft by using a first drive signal;
   estimate a second movement amount of movement amounts of a second object in a three dimensional space, which are generated due to a drive force of the first drive shaft, by using the first drive signal, the second movement amount being a movement amount in a direction different from a movement direction of the first drive shaft;
   calculate a correction amount for the first drive signal on a basis of the first movement amount and the second movement amount; and
   output a first corrected drive signal obtained by correcting the first drive signal by the correction amount to a driver to drive the first drive shaft.

2. The numerical control device according to claim 1, wherein
   the first movement amount includes at least one of a position of the first object, a displacement thereof, a velocity thereof, an acceleration thereof, an attitude thereof, a change in attitude thereof, a rate of change in attitude thereof, and an acceleration of change in attitude thereof, and
   the second movement amount includes at least one of a displacement of the second object, a velocity thereof, an acceleration thereof, a change in attitude thereof, a rate of change in attitude thereof, and an acceleration of change in attitude thereof in a three dimensional space in a direction different from a movement direction of the first drive shaft.

3. The numerical control device according to claim 1, wherein
   the first movement amount includes at least one of a position of the first object, a displacement thereof, a velocity thereof, an acceleration thereof, an attitude thereof, a change in attitude thereof, a rate of change in attitude thereof, and an acceleration of change in attitude thereof, and
   the second movement amount includes at least one of a relative displacement, a relative velocity, a relative acceleration, a change in attitude, a rate of change in relative attitude, and an acceleration of change in relative attitude, where with respect to either one of positions of the first object and the second object, the relative displacement indicates one of displacements of a relative position that is the other position, the one being a displacement in a direction different from a movement direction of the first object, the relative velocity is one of velocities of the relative position, the one being a velocity in a direction different from a movement direction of the first object, and the relative acceleration is one of accelerations of the relative position, the one being an acceleration in a direction different from a movement direction of the first object, and where with respect to either one of attitudes of the first object and the second object, the change in attitude is one of changes in relative attitude that is the other attitude, the one being a change in attitude about a center axis in a direction different from a rotational center axis of the first object, the rate of change in relative attitude is one of rates of change in attitude in the relative attitude, the one being a rate of change in attitude about a center axis in a direction different from a rotational center axis of the first object, and the acceleration of change in relative attitude is one of accelerations of change in attitude in the relative attitude, the one being an acceleration of change in attitude about a center axis in a direction different from a rotational center axis of the first object.

4. The numerical control device according to claim 1, wherein the circuitry is configured to implement a state space model in which at least one of a position of the first drive shaft, a velocity thereof, an acceleration thereof, and a drive force thereof is used as a part of inputs, and the second movement amount is used as a part of outputs or as a part of internal state amounts.

5. The numerical control device according to claim 1, wherein the circuitry is further configured to receive an input of a second movement amount estimation parameter that represents a model used to estimate the second movement amount.

6. The numerical control device according to claim 1, wherein the circuitry is further configured to
   calculate a path of the first drive shaft and a path of a second drive shaft on a basis of the first drive signal and a second drive signal to the second drive shaft;
   calculate a corrected movement amount of the first drive shaft on a basis of the first drive signal and the correction amount;
   calculate a movement amount of the second drive shaft at a position on the path corresponding to the corrected movement amount of the first drive shaft; and
   output a second corrected drive signal to a driver to drive the second drive shaft in accordance with the movement amount of the second drive shaft.

* * * * *